(12) United States Patent
Itoh et al.

(10) Patent No.: US 9,216,350 B2
(45) Date of Patent: Dec. 22, 2015

(54) INFORMATION PROCESSING APPARATUS, INFORMATION PROCESSING METHOD, INFORMATION PROCESSING PROGRAM, AND STORAGE MEDIUM STORING INFORMATION PROCESSING PROGRAM

(75) Inventors: Atsushi Itoh, Kanagawa (JP); Yuichi Kojima, Tokyo (JP); Takeshi Koyama, Tokyo (JP); Masako Hirose, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 1246 days.

(21) Appl. No.: 12/076,713

(22) Filed: Mar. 21, 2008

(65) Prior Publication Data

US 2008/0242429 A1  Oct. 2, 2008

(30) Foreign Application Priority Data

Mar. 26, 2007 (JP) ................................ 2007-079485
Oct. 3, 2007 (JP) ................................ 2007-260172
Jan. 8, 2008 (JP) ................................ 2008-001602

(51) Int. Cl.
*A63F 13/10* (2006.01)
*A63F 13/40* (2014.01)

(52) U.S. Cl.
CPC .......... *A63F 13/10* (2013.01); *A63F 2300/1087* (2013.01); *A63F 2300/203* (2013.01); *A63F 2300/65* (2013.01); *A63F 2300/69* (2013.01); *A63F 2300/8029* (2013.01)

(58) Field of Classification Search
USPC ........................................................... 463/8
See application file for complete search history.

(56) References Cited

U.S. PATENT DOCUMENTS

| | | | | |
|---|---|---|---|---|
| 6,817,979 B2* | 11/2004 | Nihtila | .......................... | 600/300 |
| 2002/0193157 A1* | 12/2002 | Yamada et al. | ................... | 463/9 |
| 2003/0008713 A1* | 1/2003 | Ushiro et al. | .................. | 463/42 |
| 2003/0051255 A1* | 3/2003 | Bulman et al. | ............... | 725/135 |
| 2003/0137107 A1* | 7/2003 | Rubin | .......................... | 273/292 |
| 2006/0003843 A1* | 1/2006 | Kobayashi et al. | ............ | 463/43 |

(Continued)

FOREIGN PATENT DOCUMENTS

| | | |
|---|---|---|
| JP | 05-30475 | 5/1993 |
| JP | 06-079061 | 3/1994 |
| JP | 10-198650 | 7/1998 |

(Continued)

OTHER PUBLICATIONS

Japanese Office Action mailed Oct. 16, 2012 for JP 2008-001602.

(Continued)

*Primary Examiner* — James S McClellan
*Assistant Examiner* — Syvila Weatherford
(74) *Attorney, Agent, or Firm* — Harness, Dickey & Pierce, P.L.C.

(57) ABSTRACT

An information processing apparatus for performing a competition game based on a game result determined from fighting information for each of a plurality of users in accordance with a predetermined rule. The fighting information is generated based on images input by the plural users. The information processing apparatus includes: an input unit inputting a picture drawn by the user as the image; a generation unit generating the fighting information used in the game based on an amount of features of the image input from the input unit; and a performing unit performing the game based on the fighting information for the plural users generated from the generation unit.

10 Claims, 18 Drawing Sheets

(56) References Cited

U.S. PATENT DOCUMENTS

2006/0281511 A1* 12/2006 Holm et al. .................. 463/9
2007/0206023 A1* 9/2007 Street et al. .................. 345/582

FOREIGN PATENT DOCUMENTS

| JP | 10-328414 | 12/1998 | | |
|---|---|---|---|---|
| JP | 2000-051534 | 2/2000 | | |
| JP | 2000-187731 | 7/2000 | | |
| JP | 2001-334012 | 12/2001 | | |
| JP | 2002-306840 | 10/2002 | | |
| JP | 2002282541 A | 10/2002 | | |
| JP | 3424021 | 5/2003 | | |
| WO | WO 2005031627 A1 * | 4/2005 | ............. | G06F 19/00 |

OTHER PUBLICATIONS

Abstract of JP publication 03-193074 published Aug. 22, 1991.
Abstract of JP publication 07-323154 published Dec. 12, 1995.
Japanese Office Action mailed Apr. 14, 2015.

* cited by examiner

FIG.4

| PARAMETER NAME | AMOUNT OF FEATURES (EXTRACTION FREQUENCY) |
|---|---|
| LIFE (PARAMETER 1) | 24732 |
| OFFENSIVE ABILITY (PARAMETER 2) | 1247 |
| DEFENSIVE ABILITY (PARAMETER 3) | 8313 |

↓ ROUNDED AMOUNT OF FEATURES = int(AMOUNT OF FEATURES/100)

| PARAMETER NAME | ROUNDED AMOUNT OF FEATURES |
|---|---|
| LIFE (PARAMETER 1) | 247 |
| OFFENSIVE ABILITY (PARAMETER 2) | 12 |
| DEFENSIVE ABILITY (PARAMETER 3) | 83 |

↓ GENERATION OF RANDOM NUMBERS BASED ON ROUNDED AMOUNT OF FEATURES
PARAMETER VALUE = int(RANDOM NUMBER VALUE × 100)

22

| PARAMETER NAME | PARAMETER VALUE |
|---|---|
| LIFE (PARAMETER 1) | 34 |
| OFFENSIVE ABILITY (PARAMETER 2) | 81 |
| DEFENSIVE ABILITY (PARAMETER 3) | 45 |

FIG.10

| PARAMETER NAME | AMOUNT OF FEATURES (DEGREE OF SIMILARITY) |
|---|---|
| LIFE (PARAMETER 1) | 0.34245 |
| OFFENSIVE ABILITY (PARAMETER 2) | 0.23561 |
| DEFENSIVE ABILITY (PARAMETER 3) | 0.73241 |

↓ PARAMETER VALUE = int(AMOUNT OF FEATURES × 100)

22

| PARAMETER NAME | PARAMETER VALUE |
|---|---|
| LIFE (PARAMETER 1) | 34 |
| OFFENSIVE ABILITY (PARAMETER 2) | 23 |
| DEFENSIVE ABILITY (PARAMETER 3) | 73 |

FIG.13

| PARAMETER NAME | AMOUNT OF FEATURES (DEGREE OF SIMILARITY) |
|---|---|
| LIFE (PARAMETER 1) | 0.34245 |
| OFFENSIVE ABILITY (PARAMETER 2) | 0.23561 |
| DEFENSIVE ABILITY (PARAMETER 3) | 0.73241 |
| MODIFICATION PARAMETER | 0.84591 |

↓ GENERATION OF RANDOM NUMBERS
↓ BASED ON DEGREE OF SIMILARITY

| PARAMETER NAME | RANDOM NUMERICAL VALUE |
|---|---|
| LIFE (PARAMETER 1) | 0.2412 |
| OFFENSIVE ABILITY (PARAMETER 2) | 0.7831 |
| DEFENSIVE ABILITY (PARAMETER 3) | 0.3101 |

PARAMETER VALUE
↓ = int(DEGREE OF SIMILARITY × 80
   + RANDOM NUMERICAL VALUE × 20)

| PARAMETER NAME | PARAMETER VALUE |
|---|---|
| LIFE (PARAMETER 1) | 32 |
| OFFENSIVE ABILITY (PARAMETER 2) | 34 |
| DEFENSIVE ABILITY (PARAMETER 3) | 74 |

INFORMATION PROCESSING APPARATUS, INFORMATION PROCESSING METHOD, INFORMATION PROCESSING PROGRAM, AND STORAGE MEDIUM STORING INFORMATION PROCESSING PROGRAM

BACKGROUND OF THE INVENTION

1. Field of the Invention

The present invention relates to an information processing apparatus, an information processing method, an information processing program, and a storage medium storing the information processing program for performing a competition game based on information input by a user.

2. Description of the Related Art

Patent Document 1 discloses a game console referred to as "barcode battler".

This game console includes a unit optically reading barcodes. The game console performs a game in which players on offense and defense sides play a match using numerical data recorded in barcodes of cards possessed by the competing players and wins and losses are decided on the basis of a game result determined from each numerical data.

There are examples of such a device for performing a competition game in which external information as in barcodes is converted to fighting information (parameters indicating fighting capabilities of a character) such as offensive ability and defensive ability of the character selected by the player in accordance with a predetermined conversion method and the converted fighting information for each character is used. Nowadays, various types of game devices have been proposed using external information including, other than barcodes, "TOC (Table of Contents) data in CDs (Compact Disc)" as disclosed in Patent Document 2, "remote control code of TVs, VCRs, and the like" as disclosed in Patent Document 3, "information relating to characters such as identification information and personality-representing information stored in storage media referred to as YUGI cards (playing cards)" as disclosed in Patent Document 4, and the like.

Players (users) are capable of playing a game using such external information other than barcodes.

Patent Document 1: Japanese Patent Publication No. 05-30475

Patent Document 2: Japanese Laid-Open Patent Application No. 06-79061

Patent Document 3: Japanese Laid-Open Patent Application No. 07-323154

Patent Document 4: Japanese Laid-Open Patent Application No. 2001 334012.

However, in addition to the game device proposed in Patent Document 1, conventional "devices for performing a game in which external information is converted to fighting information such as offensive ability and defensive ability of a character selected by the player and the converted fighting information for each character is used" simply convert the external information which has been already present including "TOC data in CDs", "remote control code of TVs, VCRs, and the like", "information relating to characters such as identification information and personality-representing information stored in storage media referred to as YUGI cards", and the like to fighting information of the character selected by the player. Accordingly, players exercise their creativity only in terms of how to select characters prepared in advance and existing external information.

Thus, in the above-mentioned game devices, the players are capable of exercising their creativity only to a limited extent in a game.

SUMMARY OF THE INVENTION

It is a general object of the present invention to provide an improved and useful information processing apparatus, information processing method, information processing program, and storage medium storing the information processing program in which the above-mentioned problems are eliminated.

A more specific object of the present invention is to provide an information processing apparatus, information processing method, information processing program, and storage medium storing the information processing program that can allow players to exercise their creativity and enjoy a game.

According to one aspect of the present invention, there is provided an information processing apparatus for performing a competition game based on a game result determined from fighting information for each of a plurality of users in accordance with a predetermined rule, the fighting information being generated based on images input by the plural users, comprising: an input unit inputting a picture drawn by the user as the image; a generation unit generating the fighting information used in the game based on an amount of features of the image input from the input unit; and a performing unit performing the game based on the fighting information for the plural users generated from the generation unit.

In accordance with this, the information processing apparatus according to the present invention inputs a character designed (drawn) by the player as an image, generates the fighting information such as the offensive ability, defensive ability, and the like used in the game from the amount of features of the input image, and performs the game based on the generated fighting information. Thus, the information processing apparatus according to the present invention is capable of allowing players to exercise their creativity and enjoy the game.

In the information processing apparatus according to the above-mentioned invention, the generation unit may repeatedly extract data from the image by predetermined bits, classify the extracted data into each type of the fighting information in accordance with a classification rule determined in advance, and generate the amount of features of the image based on extraction frequency of the classified data having the predetermined bits in each type of the fighting information.

In the information processing apparatus according to the above-mentioned invention, the generation unit may normalize a random numerical value generated based on the extraction frequency of data and generate the fighting information.

In accordance with this, the information processing apparatus according to the present invention is capable of generating the fighting information such as the offensive ability, defensive ability, and the like used in the game without depending on a format of the image input by the player.

Further, the information processing apparatus according to the present invention is capable of reducing fluctuation of a parameter value of the fighting information resulting from a reading error upon reading the image.

Further, the information processing apparatus according to the present invention sets the random numerical value generated from the amount of features of the input image as the parameter value indicating the fighting capabilities in the fighting information, so that a game result unexpected by the player is provided. Thus, the information processing apparatus according to the present invention is capable of providing a competition game allowing players to exercise their creativity.

The information processing apparatus according to the above-mentioned invention may include: a first reference image holding unit holding a reference image to be compared with the image input from the input unit, the reference image being assigned to each type of the fighting information, wherein the generation unit may generate the amount of features of the image based on a degree of similarity between the image input from the input unit and the reference image held in the first reference image holding unit.

In the information processing apparatus according to the above-mentioned invention, the generation unit may normalize the degree of similarity of the image and generate the fighting information.

In accordance with this, in the information processing apparatus according to the present invention, the reference image assigned to each parameter indicating the fighting capabilities in the fighting information is concealed from the player, so that the degree of similarity between the image designed (drawn) and input by the player and the reference image is not estimated and a game result unexpected by the player is provided. Thus, the information processing apparatus according to the present invention is capable of providing a competition game allowing players to exercise their creativity.

The information processing apparatus according to the above-mentioned invention may include: a first reference image holding unit holding a reference image to be compared with the image input from the input unit, the reference image being assigned to each type of the fighting information; and a second reference image holding unit holding a modification reference image for modifying the fighting information, wherein the generation unit may set a degree of similarity between the image input from the input unit and the modification reference image held in the second reference image holding unit as a modification parameter for the fighting information and generate the fighting information based on a random numerical value generated based on the modification parameter for the fighting information and a degree of similarity between the image input from the input unit and the reference image held in the first reference image holding unit.

In accordance with this, in the information processing apparatus according to the present invention, the reference image assigned to each parameter indicating the fighting capabilities in the fighting information is concealed from the player and the parameter value indicating the fighting capabilities in the fighting information is changed using the random numerical value, so that a game result unexpected by the player is provided. Thus, the information processing apparatus according to the present invention is capable of providing a competition game allowing players to exercise their creativity.

Further, the information processing apparatus according to the above-mentioned invention may function as an image processing apparatus, including: an image reading device as the input unit, wherein the generation unit may generate the fighting information used in the game based on the amount of features of the image read and input from the image reading device.

Further, the information processing apparatus according to the above-mentioned invention may function as an image processing apparatus, including: a start key, wherein the performing unit may perform the game when the start key is pressed.

Further, the information processing apparatus according to the above-mentioned invention may function as an image processing apparatus, including: a display device, wherein the display device may display a game status based on the game result when the game is performed.

Further, the information processing apparatus according to the above-mentioned invention may include: an extraction unit extracting a predetermined image area from the image input from the input unit, wherein the generation unit may generate the fighting information based on an amount of features of the predetermined image area extracted by the extraction unit.

According to another aspect of the present invention, there is provided an information processing method for performing a competition game based on a game result determined from fighting information for each of a plurality of users in accordance with a predetermined rule, the fighting information being generated based on images input by the plural users, comprising the steps of: inputting a picture drawn by the user as the image; generating the fighting information used in the game based on an amount of features of the image input in the inputting step; and performing the game based on the fighting information for the plural users generated in the generating step.

In accordance with this, the information processing method according to the present invention inputs a character designed by the player as an image, generates the fighting information such as the offensive ability, defensive ability, and the like used in the game from the amount of features of the input image, and performs the game based on the generated fighting information. Thus, the information processing method according to the present invention is capable of allowing players to exercise their creativity and enjoy the game.

According to another aspect of the present invention, there is provided a computer-readable information processing program for performing a competition game based on a game result determined from fighting information for each of a plurality of users in accordance with a predetermined rule, the fighting information being generated based on images input by the plural users, which, when executed by a computer, causes the computer to perform a process comprising the steps of: inputting a picture drawn by the user as the image; generating the fighting information used in the game based on an amount of features of the image input in the inputting step; and performing the game based on the fighting information for the plural users generated in the generating step.

In accordance with this, the information processing program according to the present invention causes the computer to input a character designed by the player as an image, generate the fighting information such as the offensive ability, defensive ability, and the like used in the game from the amount of features of the input image, and perform the game based on the generated fighting information.

Thus, the information processing program according to the present invention is capable of allowing players to exercise their creativity using the computer and enjoy the game.

In accordance with the present invention, it is possible to provide the information processing apparatus, information processing method, information processing program, and storage medium storing the information processing program allowing players to exercise their creativity and enjoy the game.

Other objects, features and advantage of the present invention will become more apparent from the following detailed description when read in conjunction with the accompanying drawings.

BRIEF DESCRIPTION OF THE DRAWINGS

FIG. 4 is a diagram showing an example of generating data on fighting information according to a first embodiment of the present invention;

FIG. 10 is a diagram showing an example of generating data on fighting information according to a second embodiment of the present invention;

FIG. 13 is a diagram showing an example of generating data on fighting information according to a third embodiment of the present invention;

DETAILED DESCRIPTION OF THE PREFERRED EMBODIMENTS

In the following, embodiments of the present invention will be described with reference to the accompanying drawings.

First Embodiment (Hardware Configuration of an Information Processing Apparatus)

In the following, a hardware configuration of an information processing apparatus according to the first embodiment is described with reference to FIG. 1.

Figure 1:
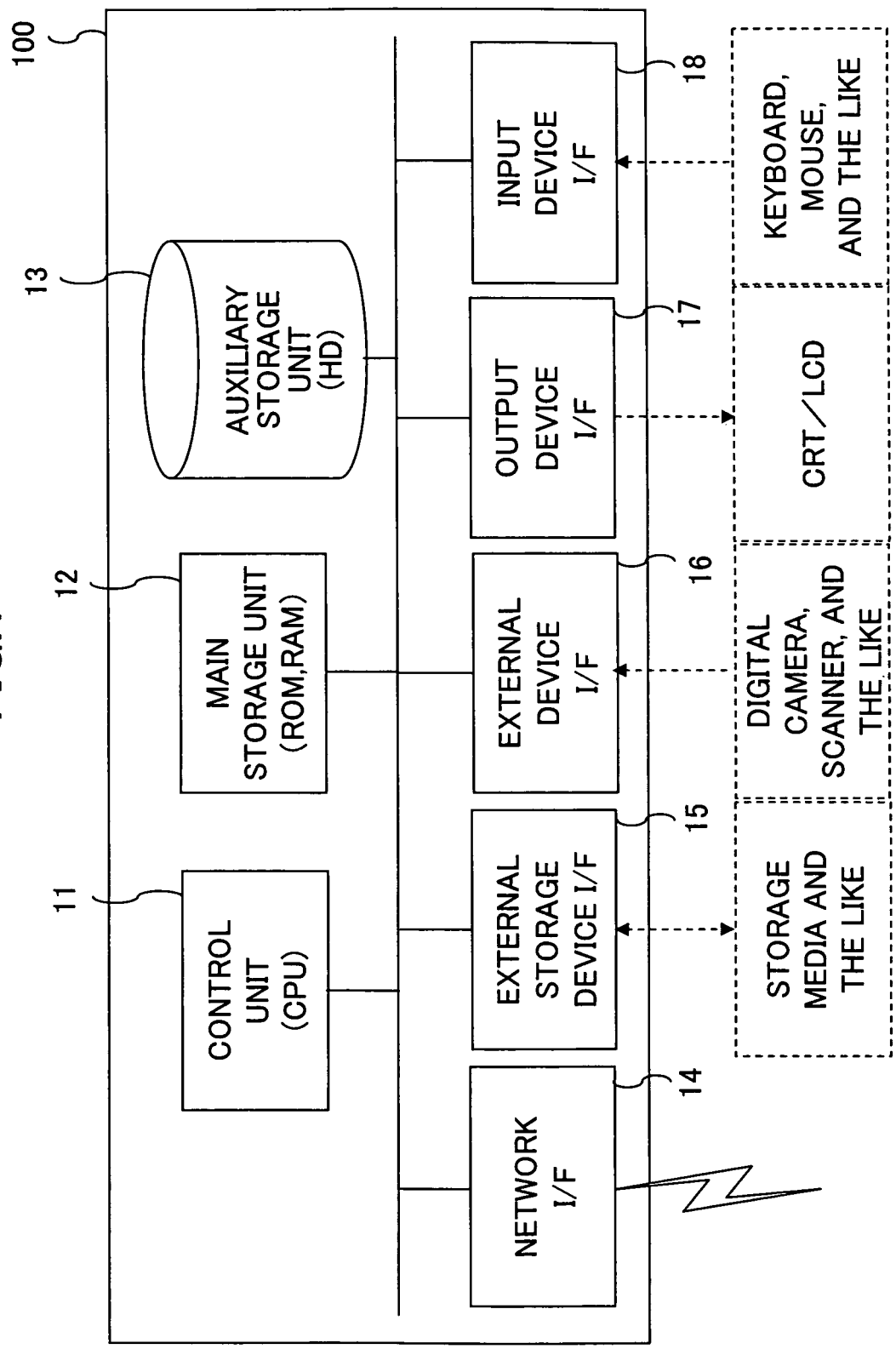
FIG. 1 is a diagram showing an example of a hardware configuration of an information processing apparatus according to a first embodiment of the present invention.

FIG. 1 is a diagram showing an example of a hardware configuration of an information processing apparatus 100 according to the first embodiment of the present invention.

As shown in FIG. 1, the information processing apparatus 100 according to the present embodiment includes a control unit 11, a main storage unit 12, an auxiliary storage unit 13, a network I/F 14, an external storage device I/F 15, an external device I/F 16, an output device I/F 17, and an input device I/F 18.

The control unit (CPU: Central Processing Unit) 11 controls each device included in the information processing apparatus 100 according to the present embodiment such as the main storage unit 12, auxiliary storage unit 13, network I/F 14, and the like described in the following. The control unit 11 is a device for executing a program stored in the main storage unit 12. For example, the control unit 11 receives data from the input device and the storage device, performs arithmetic operation and processing on the data, and outputs resultant data to the output device and the storage device (characters input from a keyboard are displayed on a display screen, for example).

The main storage unit (ROM: Read Only Memory, RAM: Random Access Memory) 12 is a device for storing (including temporary storing) a program performed by the control unit 11 and relating data. The ROM stores the program performed by the control unit 11 and the relating data. The stored program and relating data are loaded on the RAM by the control unit 11 where appropriate and are subjected to arithmetic operation or processing by the control unit 11.

The auxiliary storage unit (HD: Hard Disk) 13 is a device for storing an OS (Operating System) as basic software, application software (an information processing program according to the present embodiment, for example), and the like together with relating data. The auxiliary storage unit 13 manages these software and relating data using a data base (DB) and a file system (FS).

The network I/F 14 is an interface between the information processing apparatus 100 and a peripheral device (other information processing apparatus, for example) having a communication function connected via a network (data communication network) such as a LAN (Local Area Network), WAN (Wide Area Network), or the like constructed using a data transmission channel such as a wired and/or wireless circuit.

The external storage device I/F 15 is an interface between the information processing apparatus 100 and an external storage device (storage media and the like) connected via a data transmission channel such as a USB (Universal Serial Bus).

The external device I/F 16 is an interface between the information processing apparatus 100 and an external device (digital camera, scanner, and the like) connected via a data transmission channel such as a USB.

The information processing apparatus 100 according to the present embodiment exchanges various types of data (transmission and reception, reading and writing) with other devices via these interfaces.

The output device I/F 17 is an interface between the information processing apparatus 100 and an output device (CRT (Cathode Ray Tube), LCD (Liquid Crystal Display), and the like) connected via a data transmission channel such as a dedicated cable.

The input device I/F 18 is an interface between the information processing apparatus 100 and an input device (keyboard, mouse, and the like) connected via a data transmission channel such as a USB.

In this manner, the information processing apparatus 100 according to the present embodiment expands the program stored in a storage device such as the ROM of the main storage unit 12, the auxiliary storage unit 13, or the like on the RAM of the main storage unit 12 and executes the expanded program using the control unit 11. Accordingly, the information processing apparatus 100 realizes "game functions" described in the following. Such game functions include inputting a character designed (drawn) by a player as an image, generating fighting information (parameters indicating fighting capabilities of the character) such as offensive ability and defensive ability used in a game from an amount of features of the input image, and performing the game based on the generated fighting information.

(Units Constituting Main Functions of the Information Processing Apparatus)

with reference to FIGS. 2 to 5, the following describes each unit constituting the main functions of the "game functions" according to the present embodiment realized in accordance with a hardware configuration of the information processing apparatus 100 shown in FIG. 1.

Figure 2:
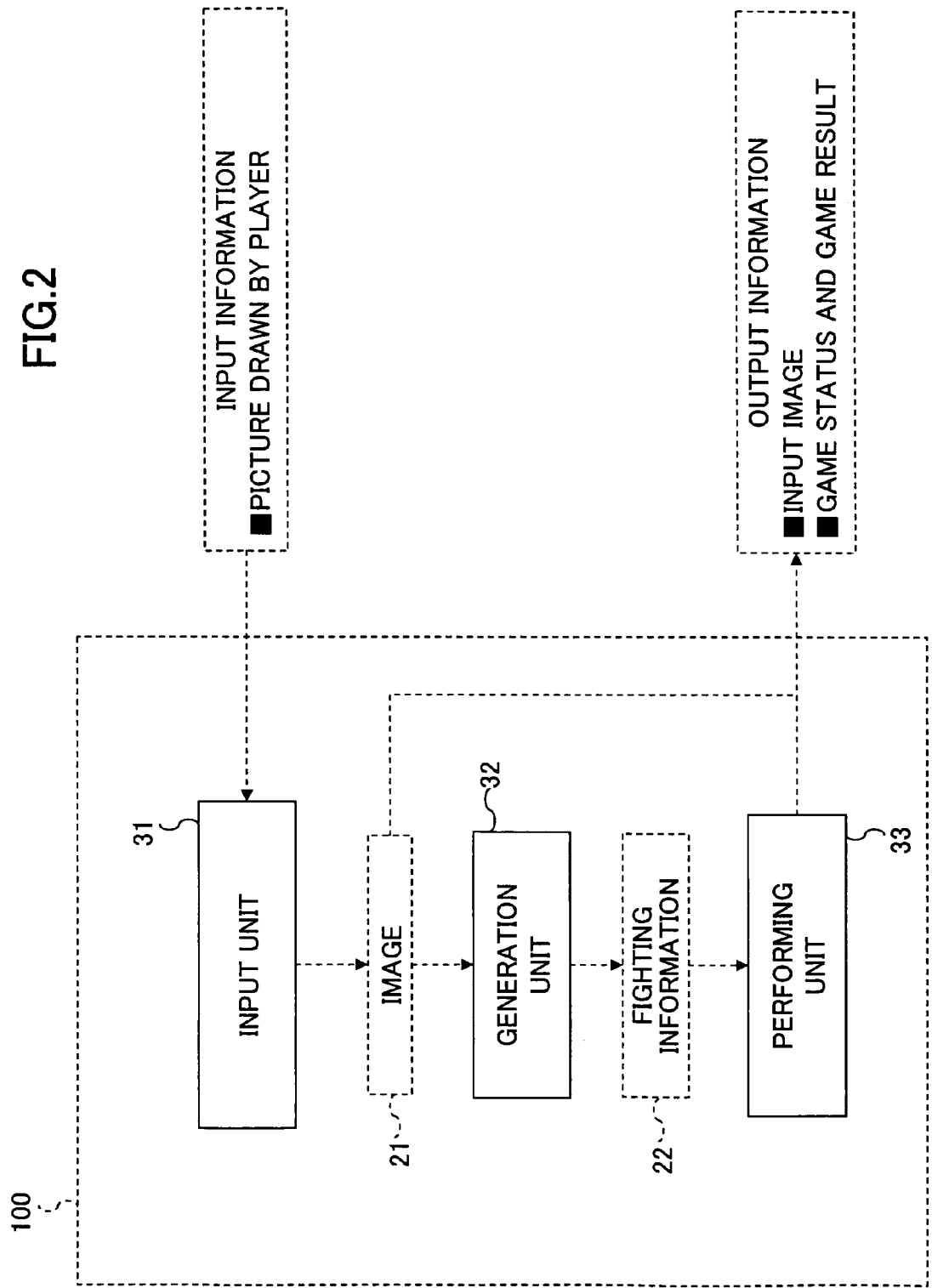
FIG. 2 is a block diagram showing an example of a main functional configuration of an information processing apparatus according to a first embodiment of the present invention.

FIG. 2 is a block diagram showing an example of units constituting the main functions of the information processing apparatus 100 according to the first embodiment of the present invention.

In the example shown in FIG. 2, the "game functions" of the information processing apparatus 100 according to the present embodiment are realized mainly by each of units constituting "a function of inputting a picture designed (drawn) by the player as an image", "a function of generating fighting information used in a game on the basis of the amount of features of the input image", and "a function of performing a game on the basis of the generated fighting information".

The functions of the information processing apparatus 100 according to the present embodiment are constructed using an input unit 31, a generation unit 32, and a performing unit 33.

The input unit 31 inputs the picture designed by the player as an image 21.

Figure 3:
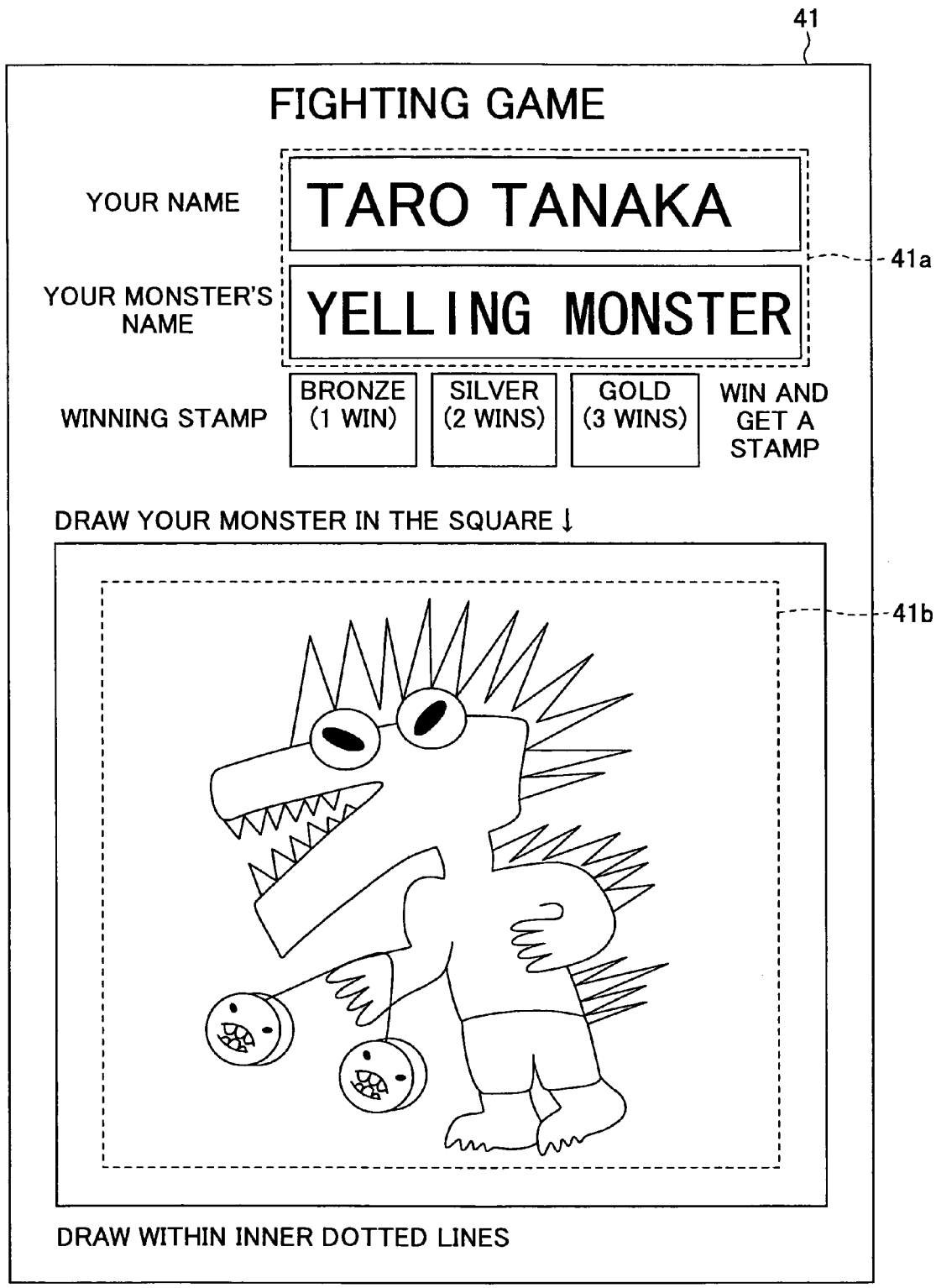
FIG. 3 is a diagram showing an example of a fighting character drawn by a user according to a first embodiment of the present invention.

FIG. 3 is a diagram showing an example of a fighting character drawn by the user according to the first embodiment of the present invention.

As shown in FIG. 3, the player is allowed to design (draw) the character in an area 41b of an image forming medium 41 and is also allowed to describe a name of the player and information relating to the character such as a name of the character in an area 41a.

In the example of FIG. 3, the player named "Taro Tanaka" designs the character as "Yelling Monster".

In this manner, the player per se is capable of creating the character used upon playing a game with other player (other user) and is capable of having fun before playing the game with other player.

The above-mentioned image forming medium 41 refers to a "human-readable and writable" medium in which "writing or drawing can be read using an image reading device or the like". Accordingly, in the present embodiment, it is possible to use writable media such as paper, electronic paper, rewritable paper, and the like in which the picture of the character and information relating to the character can be written. In the following embodiment, description is based on a case where "paper" is used as the image forming medium 41.

The input unit 31 reads the picture of the character designed by the player on the paper as shown in FIG. 3 using a scanner, for example, which is an image reading device connected via the external device I/F 16 included in the information processing apparatus 100 according to the present embodiment. From the image 21 obtained from the reading, the input unit 31 extracts an image in an area (rectangular shape, for example) determined in advance as shown in the area 41a and area 41b of FIG. 3 and inputs the extracted image to the generation unit 32 described in the following.

In addition, in the information processing apparatus 100, the image 21 of the character upon playing a game may be input via an input device such as a touch panel, an electronic tablet, and the like. For example, the input unit 31 according to the present embodiment includes a unit inputting a picture drawn via the touch panel of a game device, which is an example of the information processing apparatus 100, as the image 21.

From the image extracted (hereafter referred to as an extracted image) in the area 41a of the image 21 obtained in the above-mentioned method, the input unit 31 extracts text information such as the player's name, character's name, and the like using an OCR (Optical Character Reader) function included in the scanner and the like and holds the extracted text information on the RAM of the main storage unit 12.

Further, the input unit 31 performs the above-mentioned data processing using the control unit 11 and holds the extracted image from the area 41b in FIG. 3 on the RAM of the main storage unit 12.

Next, the generation unit 32 generates fighting information 22 used in a game on the basis of the amount of features of the image 21 input by the input unit 31.

The generation unit 32 generates the fighting information 22 in a procedure below. In the following, an example of data transition in a generation process is described with reference to FIG. 4.

FIG. 4 is a diagram showing the example of generating data on the fighting information 22 according to the first embodiment of the present invention.

(Generation Procedure A: Extraction of Data Having Predetermined Bits)

The generation unit 32 repeatedly extracts data (predetermined bit string) by predetermined bits from the extracted image held on the RAM of the main storage unit 12 by the input unit 31.

For example, when the predetermined bits are 8 bits (1 byte), the generation unit 32 successively (repeatedly) extracts 8-bit data (8-bit string) from the extracted image until data on the extracted image ends.

(Generation Procedure B: Classification of Extracted Data and Calculation of Extraction Frequency)

The generation unit 32 classifies data extracted (hereafter referred to as extracted data) in the generation procedure A into types of parameters in accordance with a classification rule determined in advance, the types of parameters indicating fighting capabilities in the fighting information 22.

As shown in FIG. 4, the parameters indicating the fighting capabilities in the fighting information 22 according to the present embodiment has three types (value is numerical) including "life (parameter 1)", "offensive ability (parameter 2)", and "defensive ability (parameter 3)".

Further, in the above-mentioned "classification rule", the extracted data (8-bit string) is classified into each of three parameter types constituting the parameters indicating the fighting capabilities in the fighting information 22, so that data ranges are assigned to each of the parameters.

For example, in the generation procedure A, data is extracted by 8 bits (1 byte). Accordingly, in a data range of two-digit hexadecimal numbers (00 to FF), a data range of 00 to 6F is classified into the "life (parameter 1)", a data range of 70 to 9F is classified into the "offensive ability (parameter 2)", and a data range of A0 to FF is classified into the "defensive ability (parameter 3)". In this manner, the data ranges for classifying into three types are determined in advance as the classification rule for each type of the parameters indicating the fighting capabilities in the fighting information 22. And information on the data ranges is stored in a non-volatile storage device such as the auxiliary storage unit 13.

The generation unit 32 classifies the extracted data in accordance with the data ranges determined in advance as the classification rule.

For example, when the extracted data is [01101100], these 8-digit binary numbers are converted to [6C] in two-digit hexadecimal numbers. Accordingly, when the extracted data is [01101100], the data is classified into the "life (parameter 1)" to which the data range from 00 to 6F is allocated. When the extracted data is [00110100], these binary numbers are converted to [34] in two-digit hexadecimal numbers, so that the data [00110100] is also classified into the "life (parameter 1)".

Further, upon classifying the extracted data, the generation unit 32 calculates extraction numbers (extraction frequency) of the extracted data in each type of the parameters indicating the fighting capabilities in the fighting information 22.

For example, in the above-mentioned example, data is extracted twice as the extracted data [01101100] and [00110100] to be classified into the "life (parameter 1)" of the parameters indicating the fighting capabilities in the fighting information 22.

A top table of FIG. 4 shows an example of extraction numbers calculated for each type of the parameters indicating the fighting capabilities in the fighting information 22 when data is repeatedly extracted by predetermined bits from a certain extracted image and the extracted data (data having predetermined bits) is classified in accordance with the classification rule.

In the present embodiment, values of the extraction numbers obtained in the generation procedure A and the generation procedure B are different depending on a bit pattern of image data, so that the values are set as the "amount of features" of the image 21.

The generation unit 32 performs the above-mentioned data processing using the control unit 11 and holds the generated (calculated) "amount of features" of the image 21 on the RAM of the main storage unit 12, the "amount of features" being shown in a column of "amount of features" in the top table of FIG. 4.

In accordance with this, the information processing apparatus 100 according to the present embodiment generates the "amount of features" of the image 21 in accordance with the bit pattern of the image 21 and also generates the fighting information 22 from the generated "amount of features" in a generation procedure C and a generation procedure D described later. Accordingly, the information processing apparatus 100 is capable of generating the fighting information 22 such as the "life (parameter 1)", "offensive ability (parameter 2)", and "defensive ability (parameter 3)" used in a game without depending on a format of the image 21 (JPEG: Joint Photographic Experts Group, PNG: Portable Network Graphics, or the like) input by the player.

(Generation procedure C: Removal of an Error Included in the Amount of Features (Calculation of Rounded Amount of Features))

The generation unit 32 removes an error (calculates a rounded amount of features) in accordance with a calculating formula below, the error being included in the "amount of features" of the image 21 generated in the above-mentioned generation procedure A and the generation procedure B when the image 21 is read using an image reading device such as a scanner.

$$\text{Rounded amount of features} = \text{int}(\text{amount of features}/100) \quad \text{(Formula 1)},$$

where "int(X)" indicates a function for obtaining an integer from a numerical value of X, and the "amount of features" represents the extraction numbers of data having predetermined bits generated for each type of the parameters indicating the fighting information 22.

The above-mentioned "error" refers to a margin of error (some extent of numerical fluctuation) generated between each image data obtained from a drawing status of a picture and characteristics of the image reading device such as a scanner when the picture on the same paper is read plural times.

Taking into consideration a possibility that values of the "amount of features" generated in the generation procedure A and the generation procedure B might be fluctuated due to such an error when the paper having the same picture thereon is read, the generation unit 32 converts (rounds) the image data to a numerical value which is not influenced from the error by dropping the last two digits as expressed by the (Formula 1).

A middle table of FIG. 4 shows an example where the amount of features shown in the top table of FIG. 4 is rounded using the (Formula 1), the amount of features being shown as the extraction numbers for each type of the parameters indicating the fighting capabilities in the fighting information 22.

For example, when the "amount of features" of the image 21 classified into the "life (parameter 1)" as a parameter indicating the fighting capabilities in the fighting information 22 is [24732], a rounded amount of features (=int (24732/100)) calculated using the (Formula 1) is [247].

Further, the information processing apparatus 100 according to the present invention is capable of reducing fluctuation of parameter values resulting from the error upon reading the image, the parameter values indicating the fighting capabilities in the fighting information 22.

(Generation Procedure D: Generation of the Fighting Information 22 Thorough Generation of Random Numerical Values and Normalization)

The generation unit 32 generates random numerical values on the basis of the rounded "amount of features" of the image 21 in the above-mentioned generation procedure C.

The random numerical values generated in this case are numerical values ranging from zero to one, so that the generation unit 32 normalizes the random numerical values (numerical values ranging from zero to one) using a calculating formula below and calculates each parameter value indicating the fighting capabilities in the fighting information 22.

$$\text{Parameter value} = \text{int}(\text{random numerical value} \times 100) \quad \text{(Formula 2)},$$

where "int(X)" indicates a function for obtaining an integer from a numerical value of X, and the "random numerical value" represents extraction numbers as the "amount of features" of the image 21 calculated and rounded for each type of the parameters indicating the fighting capabilities in the fighting information 22.

A bottom table of FIG. 4 shows an example where the rounded amount of features in each type of the parameters indicating the fighting capabilities in the fighting information 22 and shown in the middle table of FIG. 4 is normalized using the (Formula 2) and each parameter value is generated.

For example, when the random numerical value generated based on the rounded amount of features "247" of the image 21 classified into the "life (parameter 1)" of the parameters indicating the fighting capabilities in the fighting information 22 is "0.3419256 . . . ", a "life" parameter value (=int (0.341925×100)) of the parameters indicating the fighting capabilities in the fighting information 22 is calculated to be "34" using the (Formula 2).

In the present embodiment, values obtained by normalizing the random numerical values based on the rounded amount of features in the above-mentioned generation procedure D are each of parameter values ("life", "offensive ability", and "defensive ability") indicating the fighting capabilities in the fighting information 22.

The generation unit 32 performs the above-mentioned data processing using the control unit 11 and holds each parameter value ("life", "offensive ability", and "defensive ability") on the RAM of the main storage unit 12, each parameter value being included in the generated fighting information 22 (parameters indicating the fighting capabilities of the character) shown in a column of "parameter value" in the bottom table of FIG. 4.

In this manner, the information processing apparatus 100 according to the present embodiment is capable of generating the fighting information 22 based on the "amount of features" of the input image 21 in the above-mentioned generation procedures A to D.

Further, the information processing apparatus 100 according to the present embodiment sets the random numerical values generated from the "amount of features" of the input image 21 as the parameter values indicating the fighting capabilities in the fighting information 22. Accordingly, a game result is unexpected by the player, so that it is possible to provide a competition game allowing the player to exercise creativity.

The performing unit 33 performs a game based on the fighting information 22 of the player generated by the generation unit 32.

The performing unit 33 performs the game in the following procedures on the basis of the fighting information 22.
(Performing Procedure A: A Decision of Order of Movement of Players)

The performing unit 33 decides which player makes a first offensive move based on a random numerical value.
(Performing Procedure B: Offense of a Fighting Character of the Player Making the First Move (Calculation of Substantial Offensive Ability))

The performing unit 33 multiplies an "offensive ability" parameter value P2 of the fighting character of the player making the first move by a random numerical value α and calculates a value of the substantial offensive ability (=P2×α).
(Performing Procedure C: Defense of a Fighting Character of the Player Making the Second Move (Calculation of Substantial Defensive Ability))

The performing unit 33 multiplies a "defensive ability" parameter value P3 of the fighting character of the player making the second move by a random numerical value β and calculates a value of the substantial defensive ability (=P3×β).
(Performing Procedure D: Renewal of the Fighting Information 22 (Renewal of the "Life" Parameter Value))

The performing unit 33 subtracts the substantial defensive ability (=P3×β) of the fighting character of the player making the second move from the substantial offensive ability (=P2×α) of the fighting character of the player making the first move calculated in the performing procedure B (=(P2×α)−(P3×β))

The performing unit 33 further subtracts the value (=(P2×α)−(P3×β)) obtained in the above-mentioned subtraction from a "life" parameter value P1 of the fighting character of the player making the second move (=P1−((P2×α)−(P3×β))).

The performing unit 33 applies a value obtained in the above-mentioned subtraction (=P1−((P2×α)−(P3×β))) to the "life" parameter value P1 of the fighting character of the player making the second move so as to renew the "life" parameter value P1.

Next, the performing unit 33 switches the player making the first on the offense side and the player making the second move on the defense side and performs the above-mentioned performing procedures B to D.

In this manner, the performing unit 33 repeatedly performs the above-mentioned performing procedures B to D while switching the offense side and the defense side. When the "life" parameter value P1 of one of the players becomes not more than zero, the performing unit 33 judges the player as a loser of the game and ends the competition.

In the above-mentioned performing procedures, the game is supposed to be played by two players. However, when more than two players play the game, it is possible to play the game in accordance with a predetermined rule such that the fighting character of the player on the right is attacked, for example.

The performing unit 33 performs the above-mentioned data processing using the control unit 11.

Figure 5:
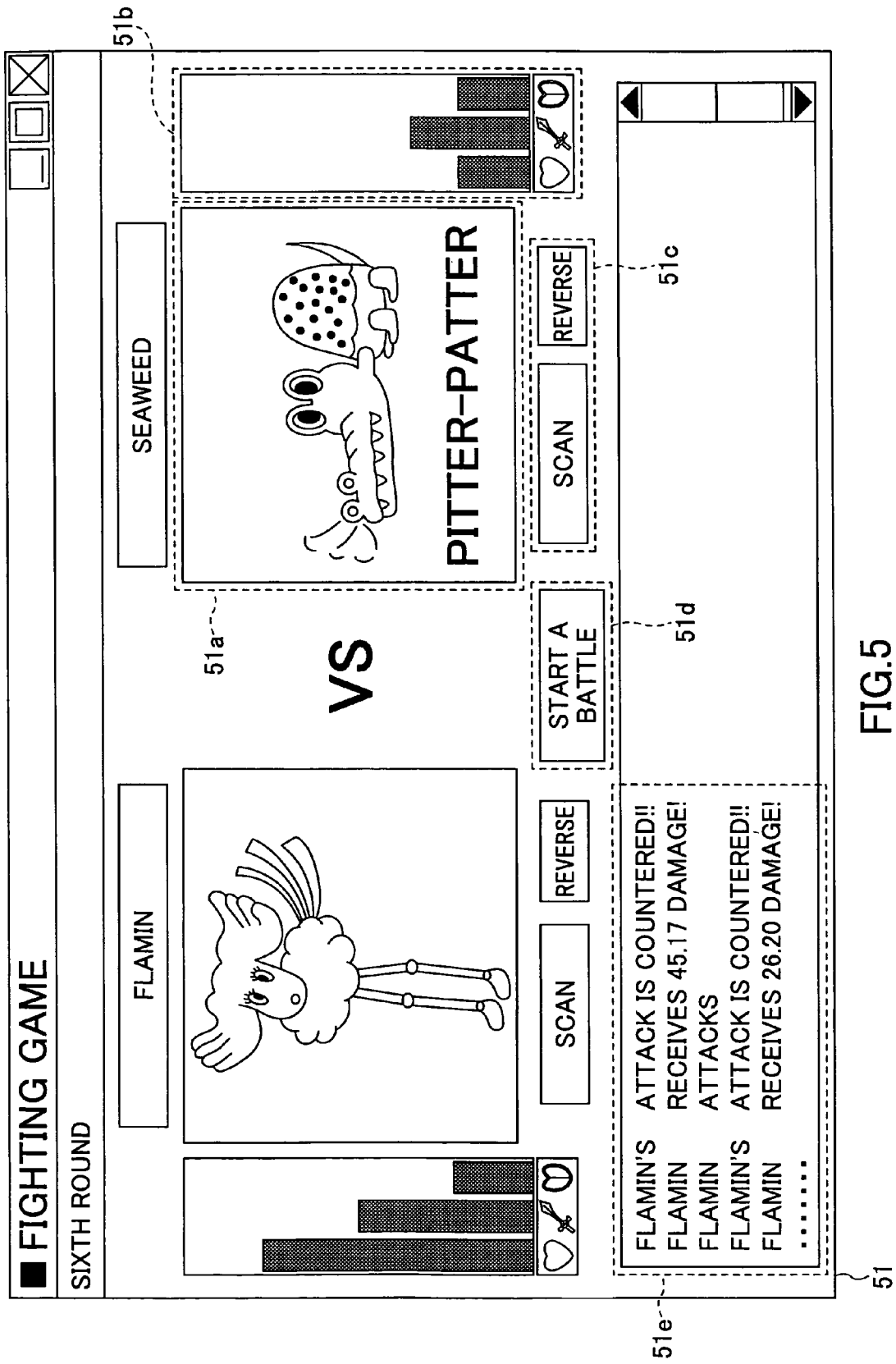
FIG. 5 is a diagram showing an example of a display screen upon performing a game according to a first embodiment of the present invention.

FIG. 5 is a diagram showing an example of a display screen 51 upon performing a game according to the first embodiment of the present invention.

In the information processing apparatus 100 according to the present embodiment, the display screen 51 including a user interface (UI) for instructing game operation is displayed as shown in FIG. 5 on a display unit such as CRT, LCD, or the like which is an output device connected via the output device I/F 17.

The display screen 51 according to the present embodiment includes an area 51a displaying a character image input by the input unit 31 and temporarily stored in the main storage unit 12, an area 51b graphically displaying each parameter value ("life", "offensive ability", and "defensive ability") in the fighting information 22 of the player, a button 51c instructing operation of the character image such as reading of the character image, reversing of the character image, and the like, a button 51d instructing a start of competition (performing a game), and an area 51e displaying a game status, and a game result, and the like.

In the present embodiment, when the player places paper on which the character is designed (drawn) on a reading unit of a scanner and selects the [scan] button 51c instructing the reading of the character image via a pointing device such as a mouse (click in a case of the mouse), a read character image (extracted image stored in the RAM of the main storage unit 12) is displayed on the area 51a. In this case, when the player wishes to reverse the displayed character image, it is possible to reverse the character image through image processing referred to as mirroring processing by selecting the [reverse] button 51c instructing a reverse display of the image. Moreover, the character's name (text information stored in the RAM of the main storage unit 12) extracted at the same time of the reading of the character image is displayed on the area 51a together with the character image.

Further, after the competing player is prepared for a game, the player making the offensive move selects the [start a battle] button 51d instructing a start of the game.

Then, plural players play the game on the basis of the fighting information 22 and the game status and the game result are displayed on the area 51e.

FIG. 5 shows an example of a game in which a character named "Flamin" and a character named "Seaweed" are used for competition.

The information processing apparatus 100 according to the present embodiment realizes each of the above-mentioned units in the following procedures.
(Procedure 1: Input of a Character Image)

The information processing apparatus 100 according to the present embodiment inputs a picture designed by the player as the image 21 using the input unit 31.

In accordance with a position and a range of an area determined in advance in a coordinate space on the paper, the input unit 31 extracts an image area in which the character is designed from the image 21 read via the image reading device such as a scanner. The extracted image is held on the RAM of the main storage unit 12.

In addition, in the information processing apparatus 100, the image 21 of the character upon playing a game may be input via an input device such as a touch panel, an electronic tablet, and the like.

For example, the input unit 31 according to the present embodiment includes a unit inputting a picture drawn via the touch panel of a game device, which is an example of the information processing apparatus 100, as the image 21.

(Procedure 2: Generation of the Fighting Information 22)

The information processing apparatus 100 according to the present embodiment generates the fighting information 22 used in a game using the generation unit 32 on the basis of the amount of features of the image 21 input by the input unit 31.

The generation unit 32 repeatedly extracts data by predetermined bits from the extracted image extracted by the input unit 31, classifies the extracted data into each type of the parameters in accordance with a predetermined classification rule, the parameters indicating the fighting capabilities in the fighting information 22, and generates the amount of features of the image 21 on the basis of the extraction frequency of the data having predetermined bits classified into each type of the parameters (Formula 1).

Further, the generation unit 32 normalizes random numerical values generated on the basis of the extraction frequency of the data which is the amount of features of the image 21 (Formula 2) and generates the fighting information 22.

(Procedure 3: Performing a Game)

The information processing apparatus 100 according to the present embodiment performs a game using the performing unit 33 on the basis of the fighting information 22 of the player generated by the generation unit 32.

The performing unit 33 decides which player makes the first offensive move based on a random numerical value, multiplies the "offensive ability" parameter value of the fighting character of the player making the first move and the "defensive ability" parameter value of the fighting character of the player making the second move by a random numerical value, and calculates values of the substantial offensive ability and the substantial defensive ability.

Next, the performing unit 33 subtracts a difference between the substantial offensive ability and the substantial defensive ability from the "life" parameter value of the fighting character of the player making the second move, and renews the "life" parameter value of the fighting character of the player making the second move.

The performing unit 33 switches the player making the first move on the offense and the player making the second move on the defense and repeatedly performs this processing until the "life" parameter value of one of the players becomes not more than zero. When the "life" parameter value of one of the players becomes not more than zero, the performing unit 33 judges the player as a loser of the game and decides a result of the competition.

In this manner, the information processing apparatus 100 according to the present embodiment inputs the character designed by the player as the image 21 in the above-mentioned procedures 1 to 3 of "game functions", generates the fighting information 22 such as the offensive ability and the defensive ability used in a game from the amount of features of the input image, and performs the game on the basis of the generated fighting information 22.

(Processing Procedure of the "Game Functions")

Figure 6:
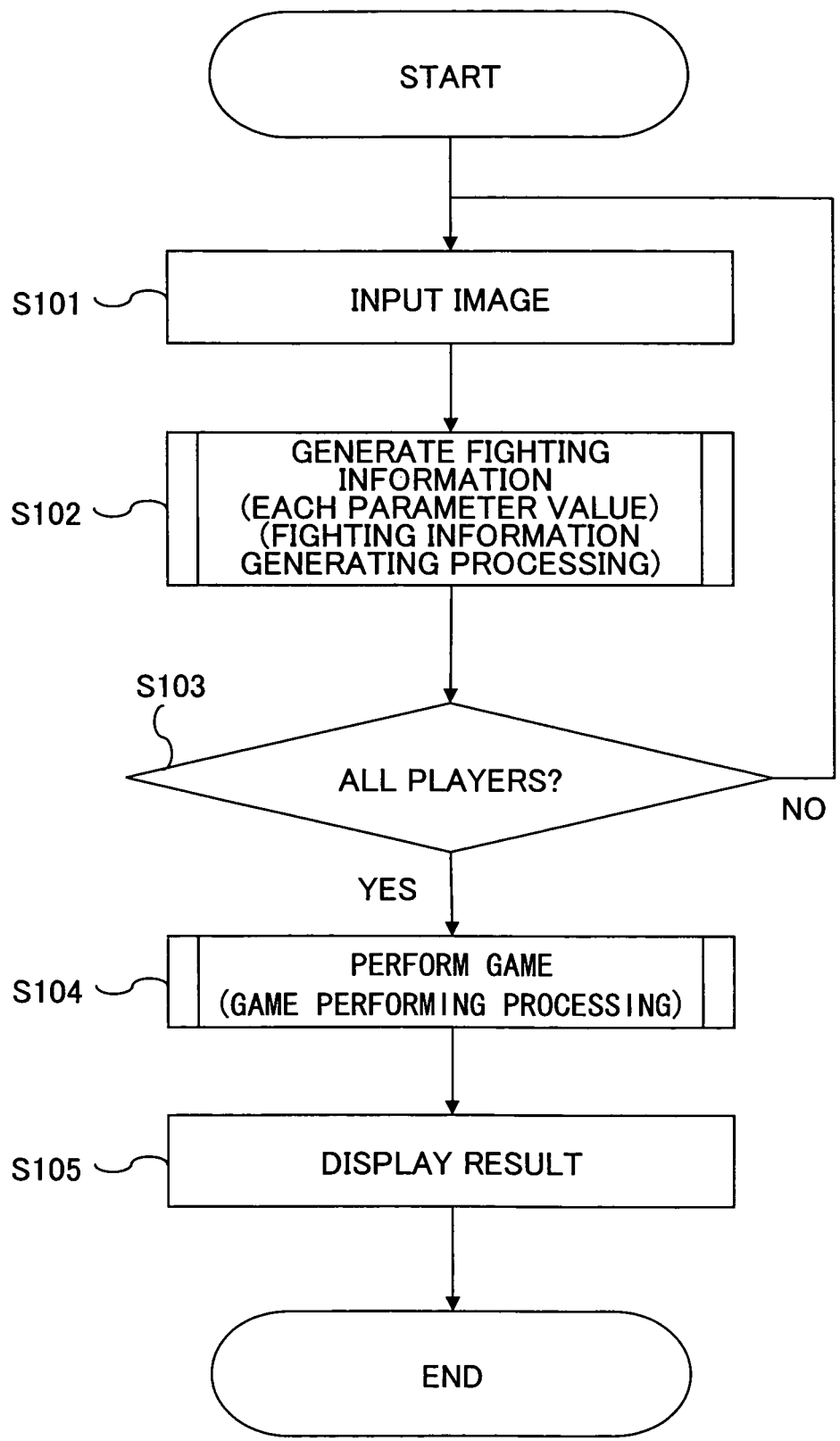
FIG. 6 is a flowchart showing an example of an information processing procedure according to a first embodiment of the present invention.
Figure 7:
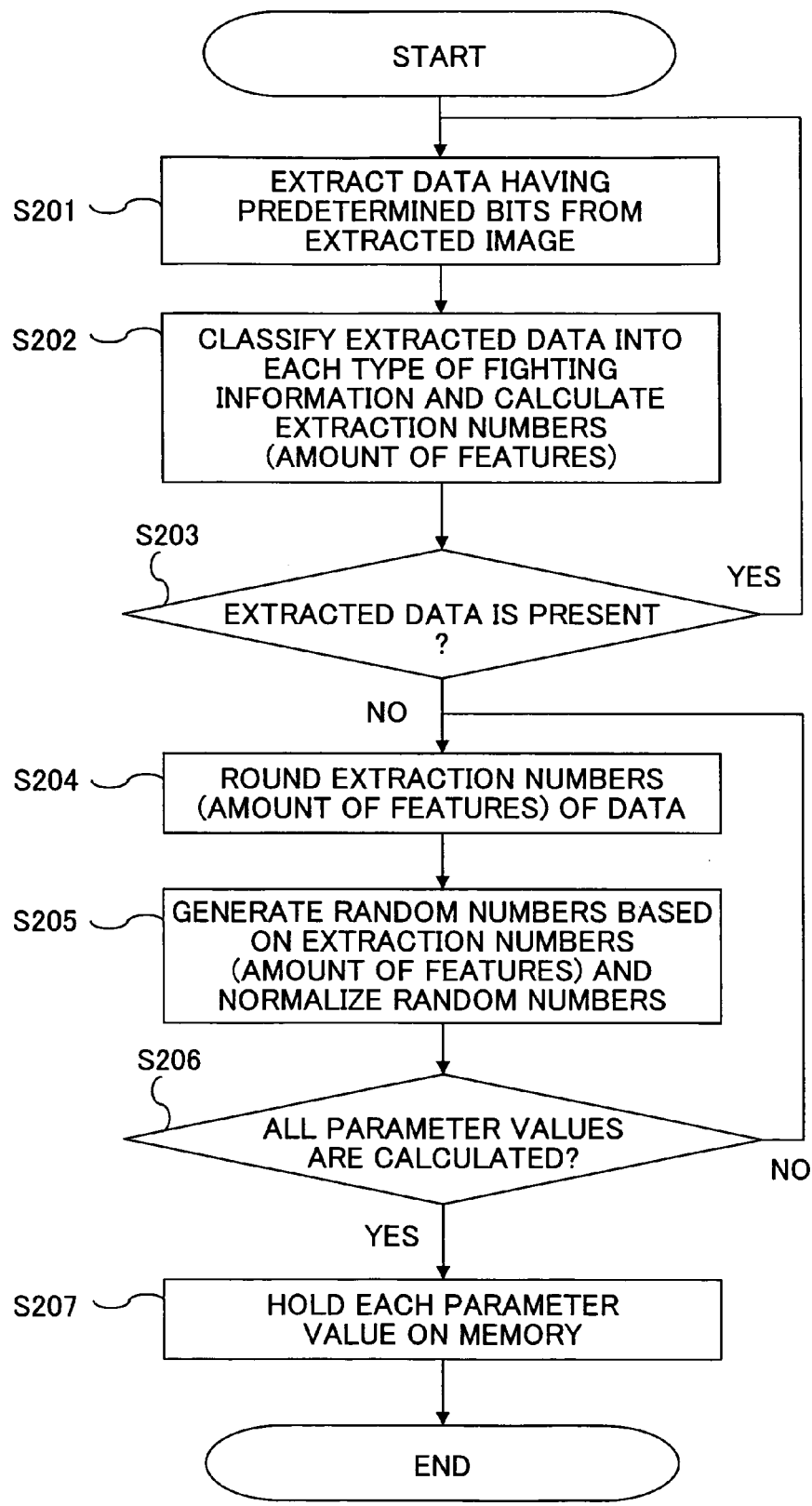
FIG. 7 is a flowchart showing an example of a processing procedure of fighting information generating processing according to a first embodiment of the present invention.
Figure 8:
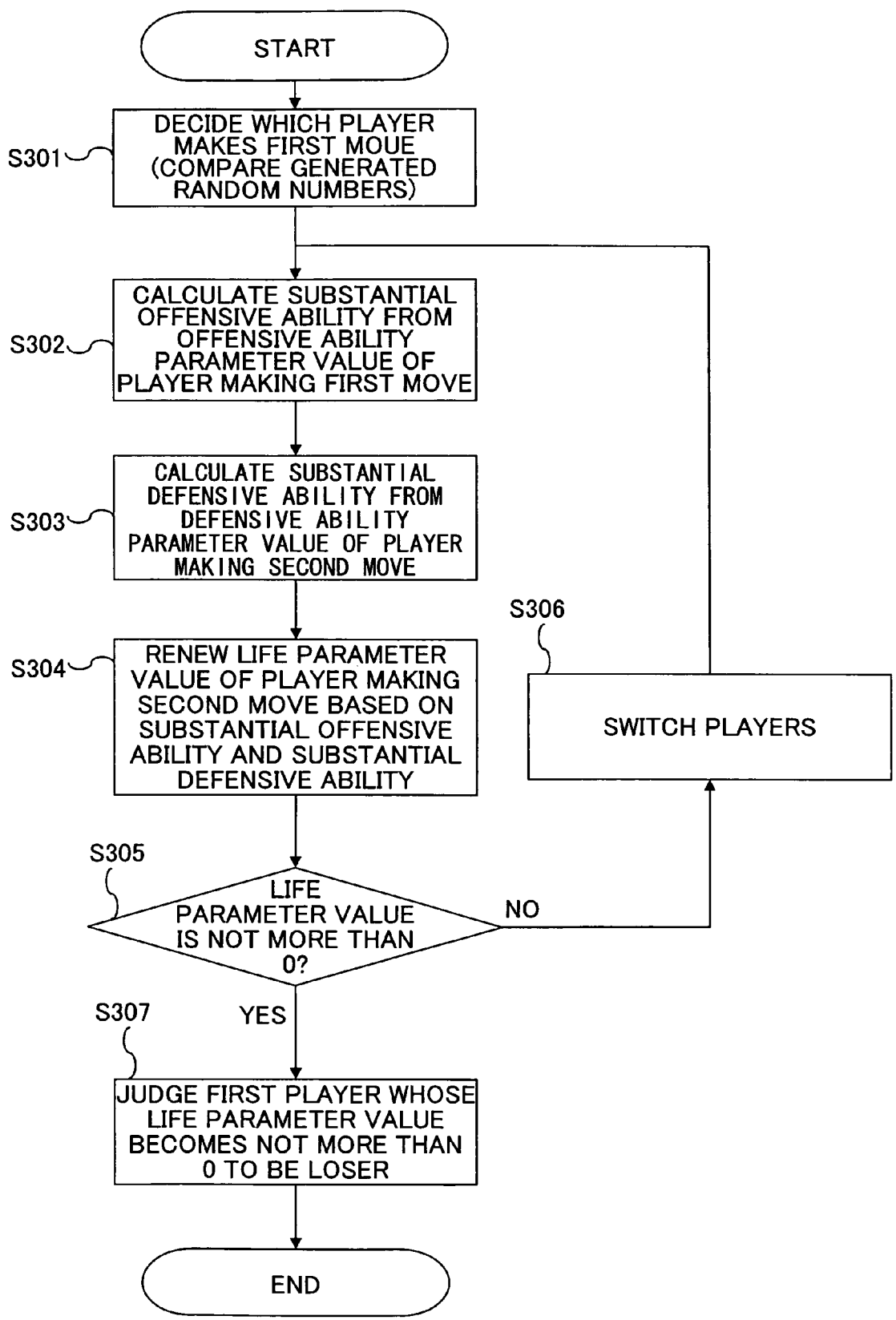
FIG. 8 is a flowchart showing an example of a processing procedure of game performing processing according to a first embodiment of the present invention.

The following describes an information processing procedure in the "game functions" included in the information processing apparatus 100 according to the present embodiment with reference to FIGS. 6 to 8.

FIG. 6 is a flowchart showing an example of the information processing procedure according to the first embodiment of the present invention.

The information processing apparatus 100 according to the present embodiment expands an information processing program for processing the "game functions" on the RAM of the main storage unit 12 and executes the program using the control unit 11, the program being stored in the auxiliary storage unit 13 included in the information processing apparatus 100. In this case, the following processing procedure (S101 to S105) is performed.

First, the information processing apparatus 100 according to the present embodiment reads the picture of the character designed by the player from an image reading device such as a scanner, extracts a predetermined area from the image 21 obtained from the reading, and inputs an extracted image obtained from the extraction (S101).

The information processing apparatus 100 generates the fighting information 22 from the input extracted image (S102).

The information processing apparatus 100 judges whether character images are input and the fighting information 22 is generated for all the players participating in a game (S103).

If there is a player participating in the game whose character image and fighting information 22 are unprocessed (NO in S103), the character image is input and the fighting information 22 is generated for the subject player.

By contrast, if processing is performed for all the players participating in the game (YES in S103), the game is performed on the basis of the fighting information 22 of each player (S104).

The information processing apparatus 100 displays the game status and the game result on a display device such as CRT, LCD, or the like (S105).

In this manner, the information processing apparatus 100 according to the present embodiment realizes the processing "for inputting the character designed by the player as the image 21, generating the fighting information 22 such as the offensive ability and the defensive ability used in the game from the amount of features of the input image 21, and performing the game on the basis of the generated fighting information 22" in the processing procedure (S101 to S105) shown in FIG. 6.

The following describes the processing procedure (S102 in FIG. 6) for generating the fighting information 22 in the information processing in the "game functions" included in the information processing apparatus 100 according to the present embodiment.

FIG. 7 is a flowchart showing an example of the processing procedure of fighting information generating processing according to the first embodiment of the present invention.

The information processing apparatus 100 according to the present embodiment extracts data having predetermined bits from the extracted image (S201).

The information processing apparatus 100 classifies the extracted data into each type of the parameters indicating the fighting capabilities in the fighting information 22 in accordance with the classification rule and calculates the extraction numbers (extraction frequency) of each type (S202).

The information processing apparatus 100 judges whether data having predetermined bits is extracted from entire data on the extracted image (S203).

If it is possible to extract data having predetermined bits from the extracted image, namely, if there is data which has not been extracted (YES in S203), the process returns to S201, extracts data having predetermined bits from the unprocessed extracted image, classifies the extracted data, and calculates the extraction numbers.

By contrast, if data having predetermined bits is extracted from the entire data on the extracted image, namely, if there is no unextracted data (NO in S203), the entire data on the extracted image is assumed to be extracted and classified and the extraction numbers of each type of the parameters indicating the fighting capabilities in the fighting information 22 are assumed to be calculated. Accordingly, the extraction numbers calculated for each type of the parameters are rounded using a predetermined calculating formula (Formula 1) (S204).

The information processing apparatus 100 normalizes the random numerical value using a predetermined calculating formula (formula 2), the random numerical value being generated on the basis of the rounded extraction numbers (extraction frequency: rounded amount of features) and sets a value obtained from the normalization as the parameter value for each type of the parameters assigned to the extraction numbers used as a base of generating the random numerical value, the parameters indicating the fighting capabilities in the fighting information 22 (S205).

The information processing apparatus 100 judges whether all values (each parameter value) for each type of the parameters indicating the fighting capabilities in the fighting information 22 are generated (calculated) (S206).

If all the values for each type of the parameters are not generated in the information processing apparatus 100 (NO in S206), the process returns to S204, rounds the unprocessed extraction numbers, normalizes the random numerical value generated from the rounded value, and sets the normalized value as a parameter value indicating the fighting capabilities in the fighting information 22.

By contrast, if all the values for each type are generated (YES in S206), the generated values for each type of the parameters indicating the fighting capabilities in the fighting information 22 are held on the RAM of the main storage unit 12 (S207).

In this manner, in the information processing apparatus 100 according to the present embodiment, an information processing program in which the above-mentioned processing procedure is coded in a programming language is expanded on the RAM of the main storage unit 12 and executed by the control unit 11 so as to realize a "fighting information generating function" of "generating the fighting information 22 such as the offensive ability and the defensive ability used in the game from the amount of features of the input image 21".

The following describes a processing procedure for performing an information processing game in the "game functions" included in the information processing apparatus 100 according to the present embodiment.

FIG. 8 is a flowchart showing an example of the processing procedure of game performing processing according to the first embodiment of the present invention.

The information processing apparatus 100 according to the present embodiment decides which player makes the first offensive move based on a random numerical value (S301).

The information processing apparatus 100 multiplies the "offensive ability" parameter value P2 of the fighting character of the player making the first move by a random numerical value $\alpha$ and calculates a value of the substantial offensive ability (=P2×$\alpha$) (S302).

The information processing apparatus 100 multiplies the "defensive ability" parameter value P3 of the fighting character of the player making the second move by a random numerical value $\beta$ and calculates a value of the substantial defensive ability (=P3×$\beta$) (S303).

The information processing apparatus 100 subtracts the substantial defensive ability (=P3×$\beta$) of the fighting character of the player making the second move from the substantial offensive ability (=P2×$\alpha$) of the fighting character of the player making the first move (=(P2×$\alpha$)−(P3×$\beta$)) and further subtracts the value (=(P2×$\alpha$)−(P3×$\beta$)) obtained in the above-mentioned subtraction from the "life" parameter value P1 of the fighting character of the player making the second move (=P1−((P2×$\alpha$)−(P3×$\beta$))) so as to renew the "life" parameter value P1 of the fighting character of the player making the second move (S304).

The information processing apparatus 100 judges whether the "life" parameter value P1 of one of the players competing in the game becomes not more than zero (S305).

If the "life" parameter value P1 is larger than zero in both players competing in the game (YES in S305), the information processing apparatus 100 switches the player making the first move on the offense and the player making the second move on the defense (S306) and the process returns to S302 so as to perform the processing procedure therefrom.

By contrast, if the "life" parameter value P1 of one of the players competing in the game becomes not more than zero (NO in S305), the information processing apparatus 100 obtains a game result that the player whose "life" parameter value P1 is not more than zero is a loser of the game and ends the competition (S307).

In this manner, in the information processing apparatus 100 according to the present embodiment, an information processing program in which the above-mentioned processing procedure is coded in a programming language is expanded on the RAM of the main storage unit 12 and executed by the control unit 11 so as to realize a "game performing processing function" for "performing the game on the basis of the generated fighting information 22".

As mentioned above, according to the first embodiment of the present invention, the information processing apparatus 100 according to the present embodiment inputs the character designed by the player as the image 21, generates the fighting information 22 such as the offensive ability, the defensive ability, and the like used in the game from the amount of features of the input image 21, and performs the game on the basis of the generated fighting information 22.

In accordance with this, the information processing apparatus 100 according to the present embodiment is capable of allowing the players to exercise their creativity and enjoy the game.

Second Embodiment

In the first embodiment, the fighting information is generated from the amount of features of the character image designed by the player.

In the second embodiment, the fighting information is generated from a degree of similarity between the character image designed by the player and a reference image used as a comparison subject.

In this manner, by generating the fighting information from the degree of similarity between the input image and the reference image, in the information processing apparatus 100 according to the present embodiment, the reference image assigned to each of the parameters indicating the fighting capabilities in the fighting information is concealed from the player. In accordance with this, the player is unable to estimate the degree of similarity of between the image designed and input by the player and the reference image and an unexpected game result is provided, so that it is possible to provide a competition game allowing the player to exercise creativity.
(Hardware Configuration of the Information Processing Apparatus)

A hardware configuration of the information processing apparatus 100 according to the present embodiment is the same as in the first embodiment, so that the same drawing and reference numerals are used and description thereof is omitted.
(Units Constituting Main Functions of the Information Processing Apparatus)

In the following, each unit constituting the main functions of the "game functions" according to the present embodiment is described with reference to FIGS. 9 and 10, the "game functions" being realized using the hardware configuration of the information processing apparatus 100 described with reference to FIG. 1.

Figure 9:
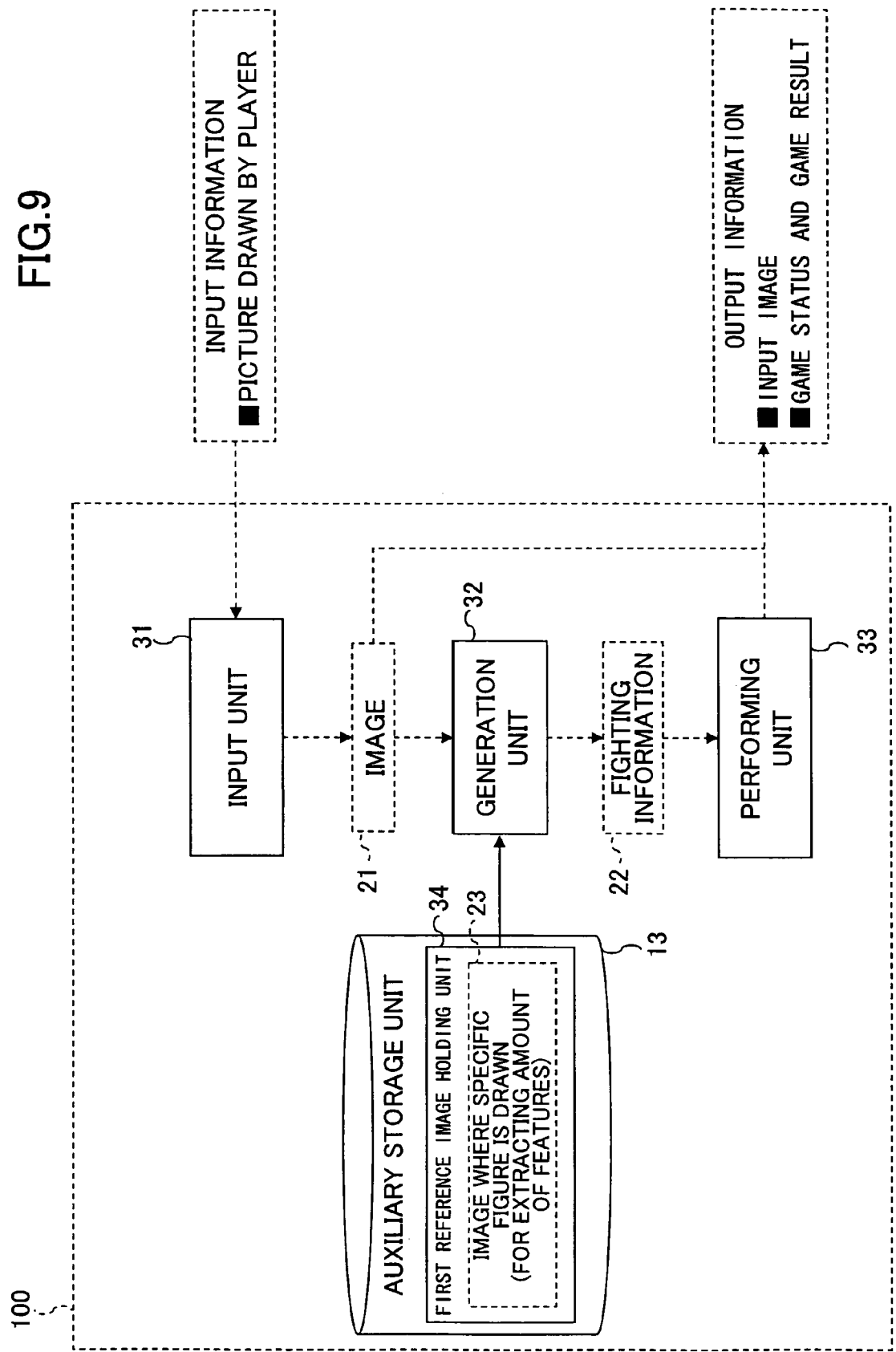
FIG. 9 is a block diagram showing an example of a main functional configuration of an information processing apparatus according to a second embodiment of the present invention.

FIG. 9 is a block diagram showing an example of the units constituting the main functions included in the information processing apparatus 100 according to the second embodiment of the present invention.

FIG. 9 shows an example where the "game functions" included in the information processing apparatus 100 according to the present embodiment are performed by each of units mainly constituting "a function of inputting a picture designed by the player as the image 21", "a function of generating the fighting information 22 used in the game on the basis of the degree of similarity between the input image 21 and a reference image 23 prepared in advance", and "a function of performing the game on the basis of the generated fighting information 22".

The functions included in the information processing apparatus 100 according to the present embodiment are constituted using the input unit 31, the generation unit 32, the performing unit 33, and a first reference image holding unit 34.

A functional configuration of the information processing apparatus 100 according to the present embodiment is substantially the same as in the first embodiment, so that only those different elements (the generation unit 32 and the first reference image holding unit 34) are described in the following and the same reference numerals are used for the same elements.

The generation unit 32 generates the fighting information 22 used in the game on the basis of the degree of similarity between the image 21 input by the input unit 31 and the reference image 23 prepared in advance.

The generation unit 32 generates the fighting information 22 in the following procedure. In the following procedure, data transition in a generation process is described with reference to FIG. 10.

FIG. 10 is a diagram showing an example of generating data on the fighting information 22 according to the second embodiment of the present invention.
(Generation Procedure A: Calculation of the Degree of Similarity Between the Extracted Image and the Reference Images)

The generation unit 32 calculates the degree of similarity between the extracted image held on the RAM of the main storage unit 12 by the input unit 31 and the reference images 23 held in the first reference image holding unit 34 described below.

In the following, the first reference image holding unit 34 is described.

The first reference image holding unit 34 holds plural reference images 23 in a nonvolatile storage device such as the auxiliary storage unit 13 so as to compare the reference images 23 with the input extracted image.

The above-mentioned "plural reference images" refer to images assigned to each of three parameter types constituting the parameters indicating the fighting capabilities in the fighting information 22. Specific figures are drawn in the images.

For example, in the three types of images including a "white image where no figure is drawn", an "image where a black triangle is drawn", and an "image where a blue quadrangle is drawn", the "white image where no figure is drawn" is assigned to the "life (parameter 1)", the "image where a black triangle is drawn" is assigned to the "offensive ability (parameter 2)", and the "image where a blue quadrangle is drawn" is assigned to the "defensive ability (parameter 3)", for example. In this manner, the reference images 23 are assigned in advance to each type of the parameters indicating the fighting capabilities in the fighting information 22 and are stored in the nonvolatile storage device such as the auxiliary storage unit 13.

The generation unit 32 successively compares the input extracted image with the reference images 23 assigned in advance to each type of the parameters indicating the fighting capabilities in the fighting information 22 and held in the first reference image holding unit 34, and calculates the degree of similarity therebetween.

A top table of FIG. 10 shows an example of the degree of similarity calculated from a certain extracted image and the reference images 23 assigned to each type of the parameters indicating the fighting capabilities in the fighting information 22.

In the present embodiment, a value of the degree of similarity obtained in the generation procedure A is different depending on image characteristics, so that this value is set as the "amount of features" of the image 21.

The generation unit 32 performs the above-mentioned data processing using the control unit 11 and stores the generated "amount of features" of the image 21 on the RAM of the main storage unit 12, the "amount of features" being shown in a column of "amount of features" in the top table of FIG. 10.

In accordance with this, the information processing apparatus 100 according to the present embodiment sets the degree of similarity between the images as the "amount of features", so that it is not necessary to perform the "removal of an error included upon reading using an image reading device such as a scanner" considered when the "amount of features" are generated from the input extracted image in the first embodiment and the information processing apparatus 100 according to the present embodiment is capable of generating the "amount of features" of the image 21.
(Generation Procedure B: Generation of the Fighting Information 22 by Normalizing the Degree of Similarity)

The "amount of features" of the image 21 generated in the above-mentioned generation procedure A is a numerical value ranging from zero to one, so that the generation unit 32 normalizes the generated amount of features (numerical value ranging from zero to one) using a calculating formula below and calculates each parameter value indicating the fighting capabilities in the fighting information 22.

$$\text{Parameter value} = \text{int}(\text{amount of features} \times 100) \quad \text{(Formula 1)},$$

where "int(X)" indicates a function for obtaining an integer from a numerical value of X, and the "amount of features" represent the degree of similarity calculated for each type of parameters indicating the fighting capabilities in the fighting information 22.

A bottom table of FIG. 10 shows an example where the "amount of features" (degree of similarity) in each type of the parameters is normalized using the (Formula 1) and each parameter value is generated, the parameters being shown in the top table of FIG. 10 and indicating the fighting capabilities in the fighting information 22.

For example, when the degree of similarity between the input extracted image and the reference image 23 assigned to the "life (parameter 1)" of the parameters indicating the fighting capabilities in the fighting information 22 is [0.34245], the "life" parameter value (=int (0.34245×100)) indicating the fighting capabilities in the fighting information 22 is calculated to be [34] using the (Formula 1).

In the present embodiment, values obtained by normalizing the amount of features in the above-mentioned generation procedure B are each of parameter values ("life", "offensive ability", and "defensive ability") indicating the fighting capabilities in the fighting information 22.

The generation unit 32 performs the above-mentioned data processing using the control unit 11 and holds each parameter value ("life", "offensive ability", and "defensive ability") on the RAM of the main storage unit 12, each parameter value indicating the fighting capabilities in the fighting information 22 and shown in a column of "parameter value" in the bottom table of FIG. 10.

In this manner, the information processing apparatus 100 according to the present embodiment is capable of generating the parameters indicating the fighting capabilities in the fighting information 22 based on the "amount of features" of the input image 21 in the above-mentioned generation procedures A and B.

Further, in the information processing apparatus 100 according to the present embodiment, the reference images 23 assigned to each of the parameters indicating the fighting capabilities in the fighting information 22 are concealed from the player. In accordance with this, the player is unable to estimate the degree of similarity between the character image designed and input by the player and the reference image 23 and an unexpected game result is provided, so that it is possible to provide a competition game allowing the player to exercise creativity.

The information processing apparatus 100 according to the present embodiment realizes each of the above-mentioned units in the following procedures.

(Procedure 1: Input of a Character Image)

The information processing apparatus 100 according to the present embodiment inputs a picture designed by the player as the image 21 using the input unit 31.

In accordance with a position and a range of an area determined in advance in a coordinate space on the paper, the input unit 31 extracts an image area in which the character is designed from the image 21 read via the image reading device such as a scanner. And the extracted image is held on the RAM of the main storage unit 12.

In addition, in the information processing apparatus 100, the image 21 of the character upon playing a game may be input via an input device such as a touch panel, an electronic tablet, and the like. For example, the input unit 31 according to the present embodiment includes a unit inputting a picture drawn via the touch panel of a game device, which is an example of the information processing apparatus 100, as the image 21.

(Procedure 2: Generation of the Fighting Information 22)

The information processing apparatus 100 according to the present embodiment generates, using the generation unit 32, the fighting information 22 used in the game on the basis of the degree of similarity between the image 21 input by the input unit 31 and the reference images 23 assigned to each type of the parameters indicating the fighting capabilities in the fighting information 22 and held in the first reference image holding unit 34.

The generation unit 32 generates the amount of features of the image 21 on the basis of the degree of similarity between the extracted image extracted by the generation unit 32 and the reference images 23 stored in the first reference image holding unit 34, normalizes the degree of similarity (Formula 1) between the images which is the amount of features of the image 21, and generates the fighting information 22.

(Procedure 3: Performing a Game)

The information processing apparatus 100 according to the present embodiment performs a game using the performing unit 33 on the basis of the fighting information 22 of the player generated by the generation unit 32.

The performing unit 33 decides which player makes the first offensive move based on a random numerical value, multiplies the "offensive ability" parameter value of the fighting character of the player making the first move and the "defensive ability" parameter value of the fighting character of the player making the second move by a random numerical value, and calculates values of the substantial offensive ability and the substantial defensive ability.

Next, the performing unit 33 subtracts a difference between the substantial offensive ability and the substantial defensive ability from the "life" parameter value of the fighting character of the player making the second move, and renews the "life" parameter value of the fighting character of the player making the second move.

The performing unit 33 switches the player making the first move on the offense and the player making the second move on the defense and repeatedly performs this processing until the "life" parameter value of one of the players becomes not more than zero. When the "life" parameter value of one of the players becomes not more than zero, the performing unit 33 judges the player as a loser of the game and decides a result of the competition.

In this manner, the information processing apparatus 100 according to the present embodiment inputs the character designed by the player as the image 21 in accordance with the above-mentioned procedures 1 to 3 of "game functions", generates the fighting information 22 such as the offensive ability and the defensive ability used in the game from the amount of features of the input image, and performs the game on the basis of the generated fighting information 22.

(Processing Procedure of the "Game Functions")

The following describes an information processing procedure in the "game functions" included in the information processing apparatus 100 according to the present embodiment. A basic processing procedure of information processing and a processing procedure of game performing processing in the "game functions" according to the present embodiment are the same as in the first embodiment, so that the same drawing and reference numerals are used and description thereof is omitted. In the following, a processing procedure (S102 in FIG. 6) of fighting information generating processing different from the first embodiment is described with reference to FIG. 11.

Figure 11:
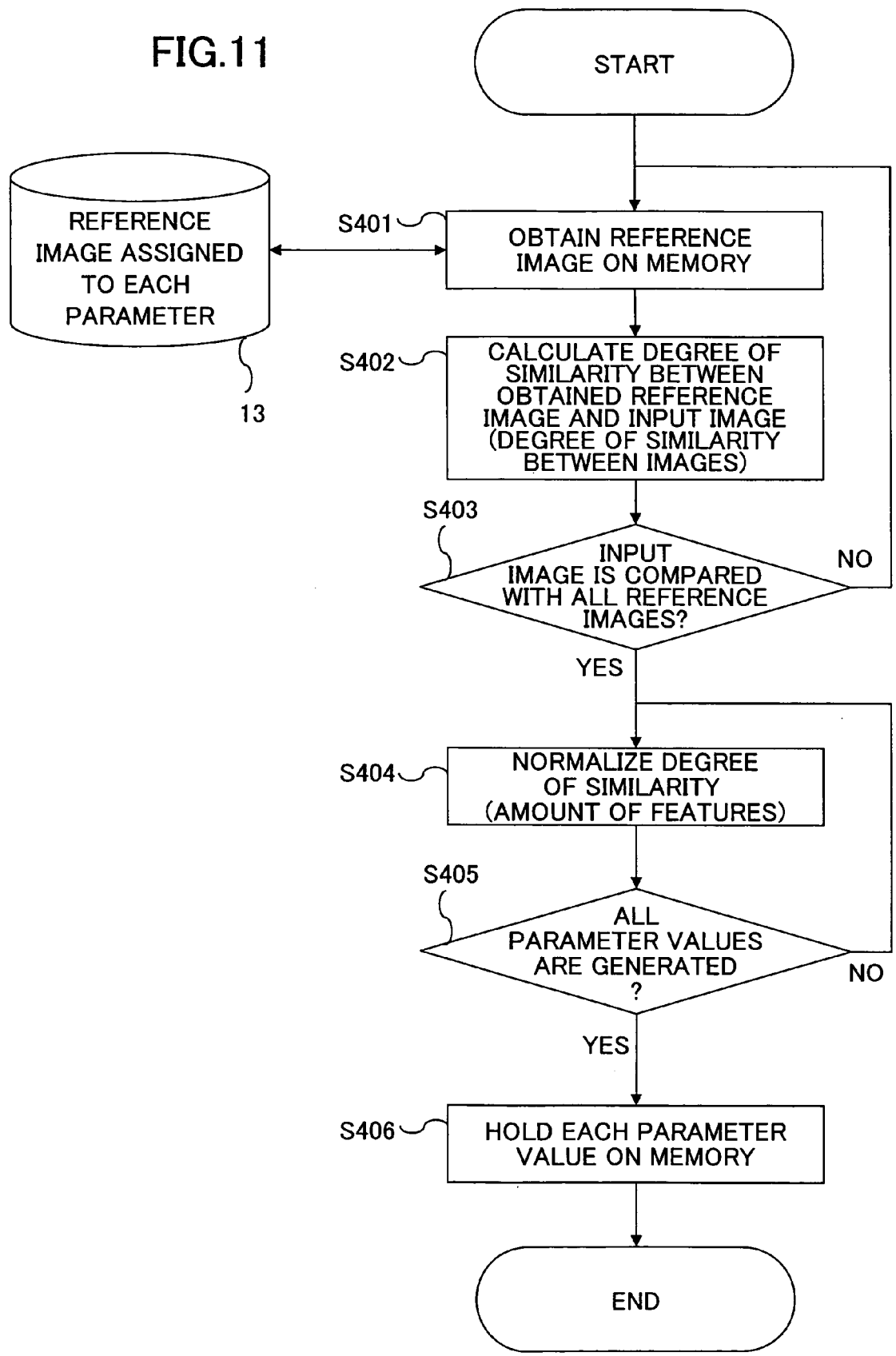
FIG. 11 is a flowchart showing an example of a processing procedure of fighting information generating processing according to a second embodiment of the present invention.

FIG. 11 is a flowchart showing an example of the processing procedure of fighting information generating processing according to the second embodiment of the present invention.

The information processing apparatus 100 according to the present embodiment obtains the reference image 23 held in a nonvolatile storage device such as the auxiliary storage unit 13 on the RAM of the main storage unit 12 (S401).

The information processing apparatus 100 compares the reference images 23 assigned to each type of the parameters indicating the fighting capabilities in the fighting information 22 with the input extracted image and calculates the degree of similarity (S402).

The information processing apparatus 100 judges whether the input extracted image is compared with all the reference images 23 assigned to each type of the parameters indicating the fighting capabilities in the fighting information 22 (S403).

If the extracted image is not compared with all the reference images 23 (NO in S403), the process returns to S401 and compares the unprocessed reference images 23 with the extracted image so as to calculates the degree of similarity.

By contrast, if the extracted image is compared with all the reference images 23 (YES in S403), the degree of similarity is assumed to be calculated for each type of the parameters indicating the fighting capabilities in the fighting information 22. The calculated degree of similarity for each type of parameters is normalized using a predetermined calculating formula (Formula 1) and values obtained from the normalization are set as each type of parameter values indicating the fighting capabilities in the fighting information 22 based on the degree of similarity (S404).

The information processing apparatus 100 judges whether all values (each parameter value) for each type of the parameters indicating the fighting capabilities in the fighting information 22 are generated (S405).

If all the values for each type of the parameters are not generated (NO in S405) in the information processing apparatus 100, the process returns to S404 and normalizes unprocessed degree of similarity so as to have parameter values indicating the fighting capabilities in the fighting information 22.

By contrast, if all the values for each type of the parameters are generated (YES in S405), the generated values for each type of the parameters indicating the fighting capabilities in the fighting information 22 are held on the RAM of the main storage unit 12 (S406).

In this manner, in the information processing apparatus 100 according to the present embodiment, an information processing program in which the above-mentioned processing procedure is coded in a programming language is expanded on the RAM of the main storage unit 12 and executed by the control unit 11 so as to realize a "fighting information generating function" for "generating the fighting information 22 such as the offensive ability and the defensive ability used in the game from the amount of features of the input image 21".

As mentioned above, according to the second embodiment of the present invention, the information processing apparatus 100 according to the present embodiment inputs the character designed by the player as the image 21, generates the fighting information 22 such as the offensive ability, the defensive ability, and the like used in the game from the amount of features of the input image 21, and performs the game on the basis of the generated fighting information 22.

In accordance with this, the information processing apparatus 100 according to the present embodiment is capable of allowing the players to exercise their creativity and enjoy the game.

Third Embodiment

In the second embodiment, the fighting information is generated from the degree of similarity between the character image designed by the player and the reference image used as a comparison subject with the character image and held in the nonvolatile storage device such the auxiliary storage unit.

In the present embodiment, the fighting information generated in the second embodiment is further modified on the basis of the character image designed by the player and new fighting information is generated.

In this manner, by generating the fighting information from the degree of similarity between the input image and the reference images and further modifying the generated fighting information on the basis of a random numerical value generated in accordance with the input image, in the information processing apparatus 100 according to the present embodiment, the reference images assigned to each of the parameters indicating the fighting capabilities in the fighting information are concealed from the player. Moreover, values of the parameters indicating the fighting capabilities in the fighting information are generated using the random numerical value, so that a game result unexpected by the player is provided and it is possible to provide a competition game allowing the player to exercise creativity.

(Hardware Configuration of the Information Processing Apparatus)

A hardware configuration of the information processing apparatus 100 according to the present embodiment is the same as in the first embodiment, so that the same drawing and reference numerals are used and description thereof is omitted.

(Units Constituting Main Functions of the Information Processing Apparatus)

In the following, each unit constituting the main functions of the "game functions" according to the present embodiment is described with reference to FIGS. 12 and 13, the "game functions" being realized using the hardware configuration of the information processing apparatus 100 described with reference to FIG. 1.

Figure 12:
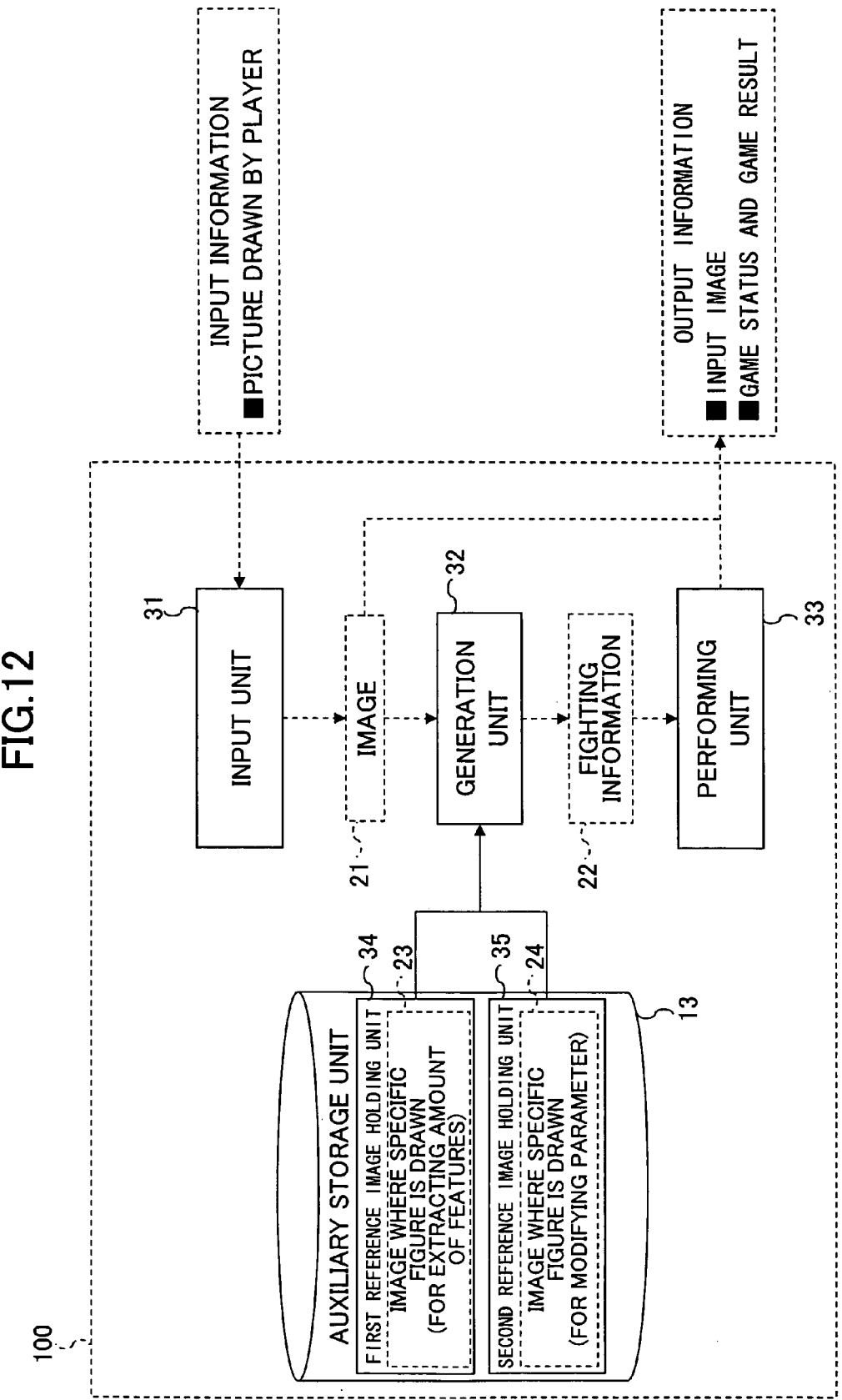
FIG. 12 is a block diagram showing an example of a main functional configuration of an information processing apparatus according to a third embodiment of the present invention.

FIG. 12 is a block diagram showing an example of the units constituting the main functions included in the information processing apparatus 100 according to the third embodiment of the present invention.

FIG. 12 shows an example where the "game functions" included in the information processing apparatus 100 according to the present embodiment are performed by each of units mainly constituting "the function of inputting a picture designed by the player as the image 21", "a function of generating the fighting information 22 used in a game on the basis of the degree of similarity between the input image 21 and the reference images 23 prepared in advance and further modifying the generated fighting information 22 on the basis of a random numerical value generated from the input image 21", and "a function of performing the game on the basis of the modified fighting information 22".

The functions included in the information processing apparatus 100 according to the present embodiment are constituted using the input unit 31, the generation unit 32, the performing unit 33, the first reference image holding unit 34, and a second reference image holding unit 35.

A functional configuration of the information processing apparatus 100 according to the present embodiment is substantially the same as in the first and second embodiments, so that only those different elements (the generation unit 32 and the second reference image holding unit 35) are described in the following and the same reference numerals are used for the same elements.

The generation unit 32 generates the fighting information 22 used in the game on the basis of the degree of similarity between the image 21 input by the input unit 31 and the reference images 23 prepared in advance.

The generation unit 32 generates the fighting information 22 in the following procedure. In the following procedure, an example of data transition in a generation process is described with reference to FIG. 13.

FIG. 13 is a diagram showing an example of generating data on the fighting information 22 according to the third embodiment of the present invention.

(Generation Procedure A: Calculation of the Degree of Similarity Between the Extracted Image and the Reference Images)

The generation unit 32 calculates the degree of similarity between the extracted image held on the RAM of the main storage unit 12 by the input unit 31 and the reference images 23 held in the first reference image holding unit 34 and the degree of similarity between the extracted image reference image 24 held in the second reference image holding unit 35.

In the following, the second reference image holding unit 35 is described.

The second reference image holding unit 35 holds the modification reference image 24 for modifying the fighting information 22 in a nonvolatile storage device such as the auxiliary storage unit 13.

The above-mentioned "modification reference image" refers to an image assigned to a modification parameter for each of the parameters indicating the fighting capabilities in the fighting information 22. Specific figures are drawn in these images.

For example, an "image where a red star is drawn" is assigned to the "modification parameter". In this manner, the modification reference image 24 is assigned to the modification parameter in advance and is stored in the nonvolatile storage device such as the auxiliary storage unit 13.

The generation unit 32 successively compares the input extracted image with the reference images 23 assigned in advance to each type of the parameters indicating the fighting capabilities in the fighting information 22 and held in the first reference image holding unit 34, and calculates the (first) degree of similarity between the images. Further, the generation unit 32 compares input extracted image with the modification reference image 24 assigned in advance to the modification parameter and held in the second reference image holding unit 35, and calculates the (second) degree of similarity between the images.

A top table of FIG. 13 shows an example of the (first) degree of similarity calculated from a certain extracted image and the reference images 23 assigned to each type of the parameters indicating the fighting capabilities in the fighting information 22. The top table of FIG. 13 also shows an example of the (second) degree of similarity calculated from the certain extracted image and the modification reference image 24 assigned to the modification parameter.

In the present embodiment, a value of the degree of similarity obtained in the above-mentioned generation procedure A is different depending on image characteristics, so that this value is set as an "amount of features" of the image 21.

The generation unit 32 performs the above-mentioned data processing using the control unit 11 and stores the generated "amount of features" of the image 21 on the RAM of the main storage unit 12, the "amount of features" being shown in a column of "amount of features" in the top table of FIG. 13.

In accordance with this, in the same manner as in the second embodiment, the information processing apparatus 100 according to the present embodiment sets the degree of similarity between the images as the "amount of features", so that it is not necessary to perform the "removal of an error included upon reading using an image reading device such as a scanner" considered when the "amount of features" are generated from the input extracted image in the first embodiment and the information processing apparatus 100 according to the present embodiment is capable of generating the "amount of features" of the image 21.

(Generation Procedure B: Generation of the Fighting Information 22 by Generating a Random Number)

The generation unit 32 generates random numerical values for a number of types of the parameters indicating the fighting capabilities in the fighting information 22 on the basis of the (second) degree of similarity for the modification parameter which is the "amount of features" of the image 21 generated in the above-mentioned generation procedure A. In the present embodiment, three random numerical values are generated for each of the "life", "offensive ability", and "defensive ability" parameters.

A middle table of FIG. 13 shows an example where the three random numerical values are generated on the basis of the amount of features (degree of similarity) [0.84591] of the modification parameter shown in the top table of the FIG. 13.

The generation unit 32 calculates each parameter value indicating the fighting capabilities in the fighting information 22 using a calculating formula below on the basis of the (first) degree of similarity for each type of the parameters indicating the fighting capabilities in the fighting information 22 and the random numerical values.

$$\text{Parameter value}=\text{int}(\text{amount of features}\times 80+\text{random numerical value}\times 20) \quad \text{(Formula 1)},$$

where "int(X)" indicates a function for obtaining an integer from a numerical value of X, and the "random numerical value" represents three random numerical values generated from the (second) degree of similarity for the modification parameter for each type of the parameters indicating the fighting capabilities in the fighting information 22.

A bottom table of FIG. 13 shows an example where each parameter value is generated using the (Formula 1) on the basis of the (first) degree of similarity for each type of the parameters indicating the fighting capabilities in the fighting information 22 shown in the top table of FIG. 13 and the random numerical value for each type of the parameters indicating the fighting capabilities in the fighting information 22 shown in the middle table of FIG. 13.

For example, when the degree of similarity between the input extracted image and the reference image 23 assigned to the "life (parameter 1)" of the parameters indicating the fighting capabilities in the fighting information 22 is [0.34245] and the random numerical value generated from the (second) degree of similarity [0.84591] for the modification parameter is [0.2412], the "life" parameter value (=int (0.34245×80+ 0.2412×20)) indicating the fighting capabilities in the fighting information 22 is calculated to be [32] using the (Formula 1).

In the present embodiment, values calculated using the (Formula 1) in the above-mentioned generation procedure B are each of parameter values ("life", "offensive ability", and "defensive ability") indicating the fighting capabilities in the fighting information 22.

The generation unit 32 performs the above-mentioned data processing using the control unit 11 and holds each parameter value ("life", "offensive ability", and "defensive ability") on the RAM of the main storage unit 12, each parameter value indicating the fighting capabilities in the fighting information 22 shown in a column of "parameter value" in the bottom table of FIG. 13.

In this manner, the information processing apparatus 100 according to the present embodiment is capable of generating the fighting information 22 on the basis of the "amount of features" of the input image 21 and the random numerical value generated from the "amount of features" of the modification parameter in the above-mentioned generation procedures A and B.

Further, in the information processing apparatus 100 according to the present embodiment, the reference images 23 assigned to each of the parameters indicating the fighting capabilities in the fighting information 22 are concealed from the player and the parameter value indicating the fighting capabilities in the fighting information 22 is generated using the random numerical value. In accordance with this, a game result unexpected by the player is provided and it is possible to provide a competition game allowing the player to exercise creativity.

The information processing apparatus 100 according to the present embodiment realizes each of the above-mentioned units in the following procedures.

(Procedure 1: Input of a Character Image)

The information processing apparatus 100 according to the present embodiment inputs a picture designed by the player as the image 21 using the input unit 31.

In accordance with a position and a range of an area determined in advance in a coordinate space on the paper, the input unit 31 extracts an image area in which the character is designed from the image 21 read via the image reading device such as a scanner. And the extracted image is held on the RAM of the main storage unit 12.

In addition, in the information processing apparatus 100, the image 21 of the character upon playing a game may be input via an input device such as a touch panel, an electronic tablet, and the like. For example, the input unit 31 according to the present embodiment includes a unit inputting a picture drawn via the touch panel of a game device, which is an example of the information processing apparatus 100, as the image 21.

(Procedure 2: Generation of the Fighting Information 22)

The information processing apparatus 100 according to the present embodiment generates, using the generation unit 32, the fighting information 22 used in a game on the basis of the degree of similarity between the image 21 input by the input unit 31 and the reference images 23 assigned to each type of the parameters indicating the fighting capabilities in the fighting information 22 and held in the first reference image holding unit 34 and the modification reference image 24 held in the second reference image holding unit 35.

The generation unit 32 sets the degree of similarity between the extracted image extracted by the input unit 31 and the modification reference image 24 held in the second reference image holding unit 35 as the modification parameter for the fighting information 22. The generation unit 32 generates the fighting information 22 through calculation using the (Formula 1) on the basis of the random numerical value generated from the modification parameter for the fighting information 22 and the degree of similarity between the extracted image input by the input unit 31 and the reference images 23 assigned to each type of the parameters indicating the fighting capabilities in the fighting information 22 and held in the first reference image holding unit 34.

(Procedure 3: Performing a Game)

The information processing apparatus 100 according to the present embodiment performs a game using the performing unit 33 on the basis of the fighting information 22 of the player generated by the generation unit 32.

The performing unit 33 decides which player makes the first offensive move based on a random numerical value, multiplies the "offensive ability" parameter value of the fighting character of the player making the first move and the "defensive ability" parameter value of the fighting character of the player making the second move by a random numerical value, and calculates values of the substantial offensive ability and the substantial defensive ability.

Next, the performing unit 33 subtracts a difference between the substantial offensive ability and the substantial defensive ability from the "life" parameter value of the fighting character of the player making the second move, and renews the "life" parameter value of the fighting character of the player making the second move.

The performing unit 33 switches the player making the first move on the offense and the player making the second move on the defense and repeatedly performs this processing until the "life" parameter value of one of the players becomes not more than zero. When the "life" parameter value of one of the players becomes not more than zero, the performing unit 33 judges the player as a loser of the game and decides a result of the competition.

In this manner, the information processing apparatus 100 according to the present embodiment inputs the character designed by the player as the image 21 in accordance with the above-mentioned procedures 1 to 3 of the "game functions", generates the fighting information 22 such as the offensive ability and the defensive ability used in the game on the basis of the amount of features of the input image and the random numerical value generated from the amount of features, and performs the game on the basis of the generated fighting information 22.

(Processing Procedure of the "Game Functions")

The following describes an information processing procedure in the "game functions" included in the information processing apparatus 100 according to the present embodiment.

A basic processing procedure of information processing and a processing procedure of game performing processing in the "game functions" according to the present embodiment are the same as in the first embodiment, so that the same drawing and reference numerals are used and description thereof is omitted. In the following, a processing procedure (S102 in FIG. 6) of fighting information generating processing different from the first embodiment is described with reference to FIG. 14.

Figure 14:
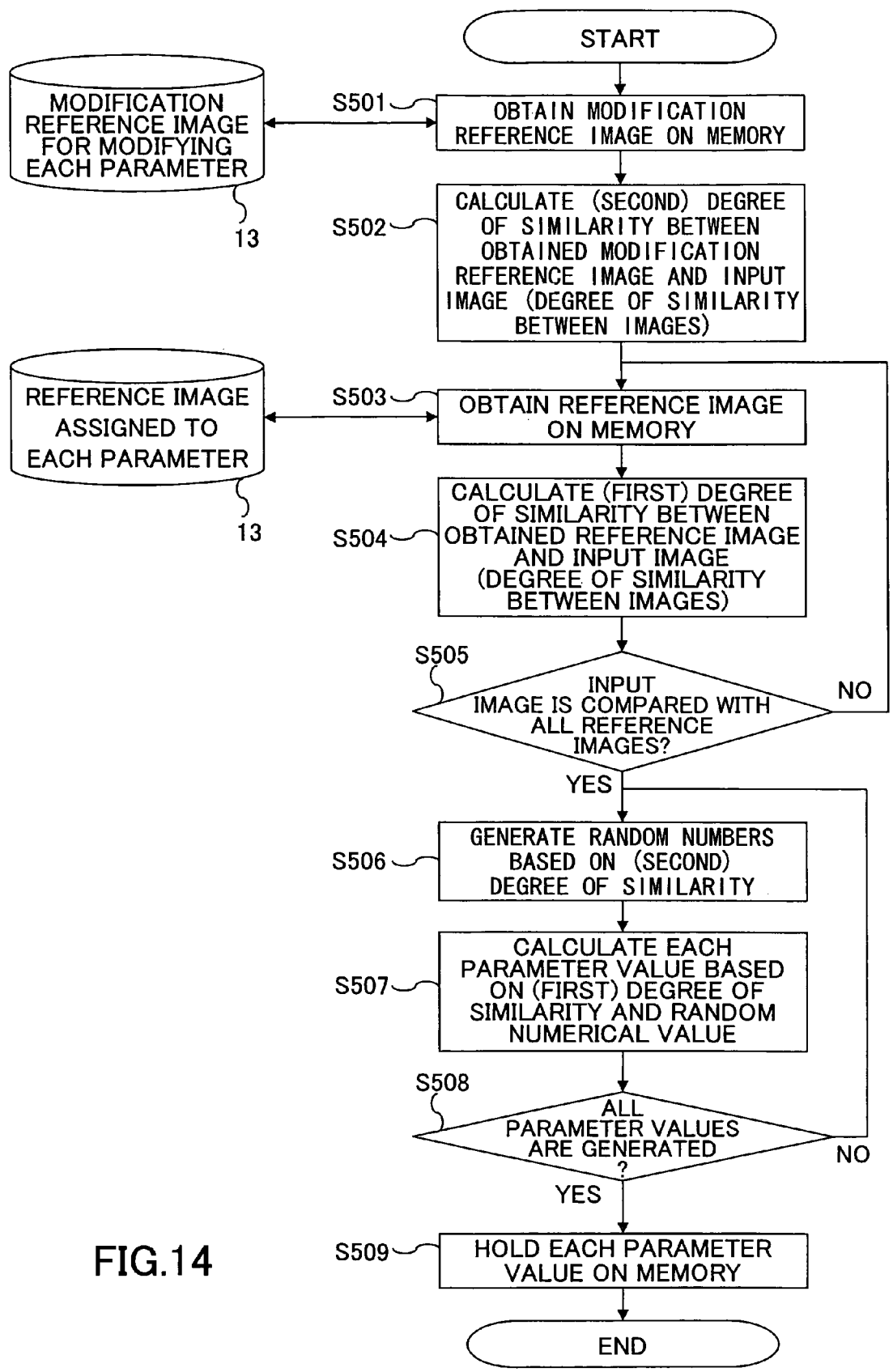
FIG. 14 is a flowchart showing an example of a processing procedure of fighting information generating processing according to a third embodiment of the present invention.

FIG. 14 is a flowchart showing an example of the processing procedure of fighting information generating processing according to the third embodiment of the present invention.

The information processing apparatus 100 according to the present embodiment obtains the modification reference image 24 held in a nonvolatile storage device such as the auxiliary storage unit 13 on the RAM of the main storage unit 12 (S501).

The information processing apparatus 100 compares the modification reference image 24 assigned to the modification parameter for the parameters indicating the fighting capabilities in the fighting information 22 and the input extracted image and calculates the (second) degree of similarity (S502).

Next, the information processing apparatus 100 obtains the reference images 23 held in the nonvolatile storage device such as the auxiliary storage unit 13 on the RAM of the main storage unit 12 (S503).

The information processing apparatus 100 compares the reference images 23 assigned to each type of the parameters indicating the fighting capabilities in the fighting information 22 with the input extracted image and calculates the (first) degree of similarity (S504).

The information processing apparatus 100 judges whether the input extracted image is compared with all the reference images 23 assigned to each type of the parameters indicating the fighting capabilities in the fighting information 22 (S505).

If the extracted image is not compared with all the reference images 23 (NO in S505), the process returns to S503 and compares the extracted image with unprocessed reference images 23 so as to calculate the (first) degree of similarity.

By contrast, if the extracted image is compared with all the reference images 23 (YES in S505), the information processing apparatus 100 generates random numerical values for the number of types of the parameters indicating the fighting capabilities in the fighting information 22 on the basis of the (second) degree of similarity for the modification parameter for the fighting information 22 (S506).

Further, based on the generated random numerical value and the (first) degree of similarity for each type of the parameters indicating the fighting capabilities in the fighting information 22, the information processing apparatus 100 calculates each type of parameter values indicating the fighting capabilities in the fighting information 22 using a predetermined calculating formula (Formula 1) on the basis of the (first) degree of similarity (S507).

The information processing apparatus 100 judges whether all values of each type of the parameters (each parameter value) indicating the fighting capabilities in the fighting information 22 are generated (S508).

If the information processing apparatus 100 has not generated all the values of each type of the parameters (NO in S508), the process returns to S506 and calculates values of the parameters indicating the fighting capabilities in the fighting information 22 on the basis of the unprocessed (first) degree of similarity using a predetermined calculating formula (Formula 1).

By contrast, if all the values of each type of the parameters are generated (YES in S508), the generated values of each type of the parameters indicating the fighting capabilities in the fighting information 22 are held on the RAM of the main storage unit 12 (S509).

In this manner, in the information processing apparatus 100 according to the present embodiment, an information processing program in which the above-mentioned processing procedure is coded in a programming language is expanded on the RAM of the main storage unit 12 and executed by the control unit 11 so as to realize a "fighting information generating function" for "generating the fighting information 22 such as the offensive ability and the defensive ability used in the game from the amount of features of the input image 21 and the random numerical value generated from the amount of features".

As mentioned above, according to the third embodiment of the present invention, the information processing apparatus 100 according to the present embodiment inputs the character designed by the player as the image 21, generates the fighting information 22 such as the offensive ability, the defensive ability, and the like used in the game on the basis of the amount of features of the input image 21 and the random numerical value generated from the amount of features, and performs the game on the basis of the generated fighting information 22.

In accordance with this, the information processing apparatus 100 according to the present embodiment is capable of allowing the player to exercise creativity and enjoy the game.

Fourth Embodiment

In the first to third embodiments, the character image designed by the player is read using an image reading device such as a scanner connected via the external device I/F 16 included in the information processing apparatus 100 as shown in the example of the hardware configuration of FIG. 1 and the game is performed.

When a competition game is to be performed in each of the above-mentioned embodiments, the information processing apparatus must be constituted using plural devices such as a scanner inputting an image, a PC (Personal Computer) performing the game on the basis of the image input from the scanner, and the like, so that an operating environment for performing the competition game requires a complicated preparation.

In view of this, in the present embodiment, a series of procedures for the competition game described in each embodiment is realized using an image processing apparatus as the information processing apparatus 100.

In accordance with this, the image processing apparatus according to the present embodiment is capable of providing a competition game readily operable for the players in which the players are allowed to exercise their creativity.

In the present embodiment, only those elements different from each of the above-mentioned embodiments are described in the following and the same drawing and the same reference numerals are used for the same element and description thereof is omitted.

(Hardware Configuration of the Image Processing Apparatus)

Figure 15:
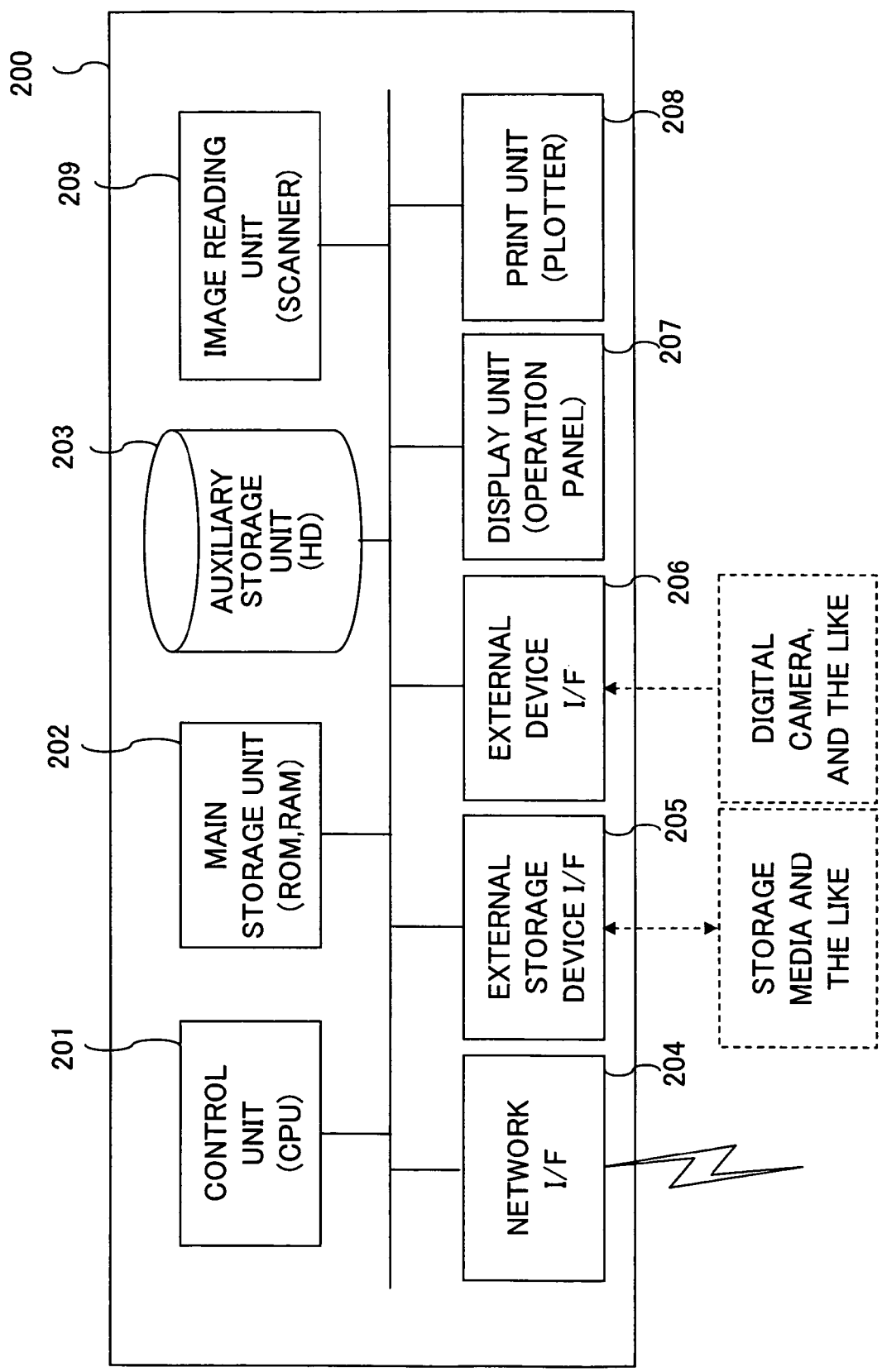
FIG. 15 is a diagram showing an example of a hardware configuration of an image processing apparatus according to a fourth embodiment of the present invention.

FIG. 15 is a diagram showing an example of a hardware configuration of an image processing apparatus 200 according to a fourth embodiment of the present invention.

As shown in FIG. 15, the image processing apparatus 200 according to the present embodiment includes a control unit 201, a main storage unit 202, an auxiliary storage unit 203, a network I/F 204, an external storage device I/F 205, an external device I/F 206, a display unit 207, a print unit 208, and an image reading unit 209.

The control unit (CPU) 201 controls each of devices such as the network I/F 204, print unit 208, image reading unit 209, and the like included in the image processing apparatus 200 according to the present embodiment. The control unit 201 is a device for executing a program stored in the main storage unit 202. For example, the control unit 201 receives data from the network I/F 204 and the image reading unit 209, performs arithmetic operation or processing on the data, and outputs resultant data to the print unit 208 and the auxiliary storage unit 203. The control unit 11 operates and executes a program for realizing each function included in the image processing apparatus 200 on the basis of necessary data.

The main storage unit (ROM, RAM) 202 is a device for storing (including temporary storing) a program, data, and the like executed by the control unit 11 such as an OS (printer system, for example) as basic software controlling an entire portion of the image processing apparatus 200, application software (PDL (Printer Description Language) interpreter, for example) for realizing each function included in the image processing apparatus 200. The program and relating data stored in the ROM and the like are expanded on the RAM where appropriate and operated and processed by the control unit 11.

The auxiliary storage unit (HD) 203 is a device for storing the OS as basic software, data relating to the application software, data input from the network I/F 204 and the image reading unit 209, and the like. The auxiliary storage unit 203 manages the data using functions of a data base (DB), a file system (FS), and the like.

The network I/F 204 is an interface between the image processing apparatus 200 and a peripheral device having a communication function connected via a network (data communication network) such as a LAN, WAN, or the like constructed using a data transmission channel such as a wired and/or wireless circuit. The network I/F 204 performs bidirectional communication between the image processing apparatus 200 and the peripheral device connected via the data transmission channel.

The external storage device I/F 205 is an interface between the image processing apparatus 200 and an external storage device (storage media, for example) connected via a data transmission channel such as a USB.

The external device I/F 206 is an interface between the image processing apparatus 200 and an external device (digital camera, and the like) connected via a data transmission channel such as a USB.

The image processing apparatus 200 according to the present embodiment exchanges (transmission and reception, reading and writing) various types of data (such as image data) with other devices via these interfaces.

The display unit (operation panel) 207 is constructed using a key switch (hard key) including a start key and the like and LCD provided with a touch panel function (including a GUI (Graphical User Interface) software key). The display unit 207 is a device for notifying function information when each function included in the image processing apparatus 200 is used and functioning as UI receiving operational instruction, operational condition setting, and the like from the user.

The print unit (plotter) 208 is a device for outputting (printing) image data to an image forming medium in an electrophotographic process (exposure, latent image, development, and transfer processes) upon receiving the image data.

The image reading unit (scanner) 209 includes a line sensor with a CCD (Charge Coupled Devices) photoelectric converter, an A/D converter, and a driving circuit for driving these elements. The image reading unit 209 is a device for scanning a document set on a document reading surface (contact glass) and generating eight-bit digital image data for each of RGB colors (information is read from a document and computerized).

In this manner, the image processing apparatus 200 according to the present embodiment expands the program, relating data, and the like stored in the main storage unit 202, the auxiliary storage unit 203, a storage medium, and the like on the RAM of the main storage unit 202 and executes the program, relating data, and the like by the control unit 201. Accordingly, the image processing apparatus 200 realizes "game functions" described in the following. Such game functions include inputting a character designed by the player as an image, generating, from an amount of features of the input image, fighting information such as offensive ability and defensive ability used in a game, and performing the game based on the generated fighting information.

(Units Constituting Main Functions of the Image Processing Apparatus)

Figure 16:
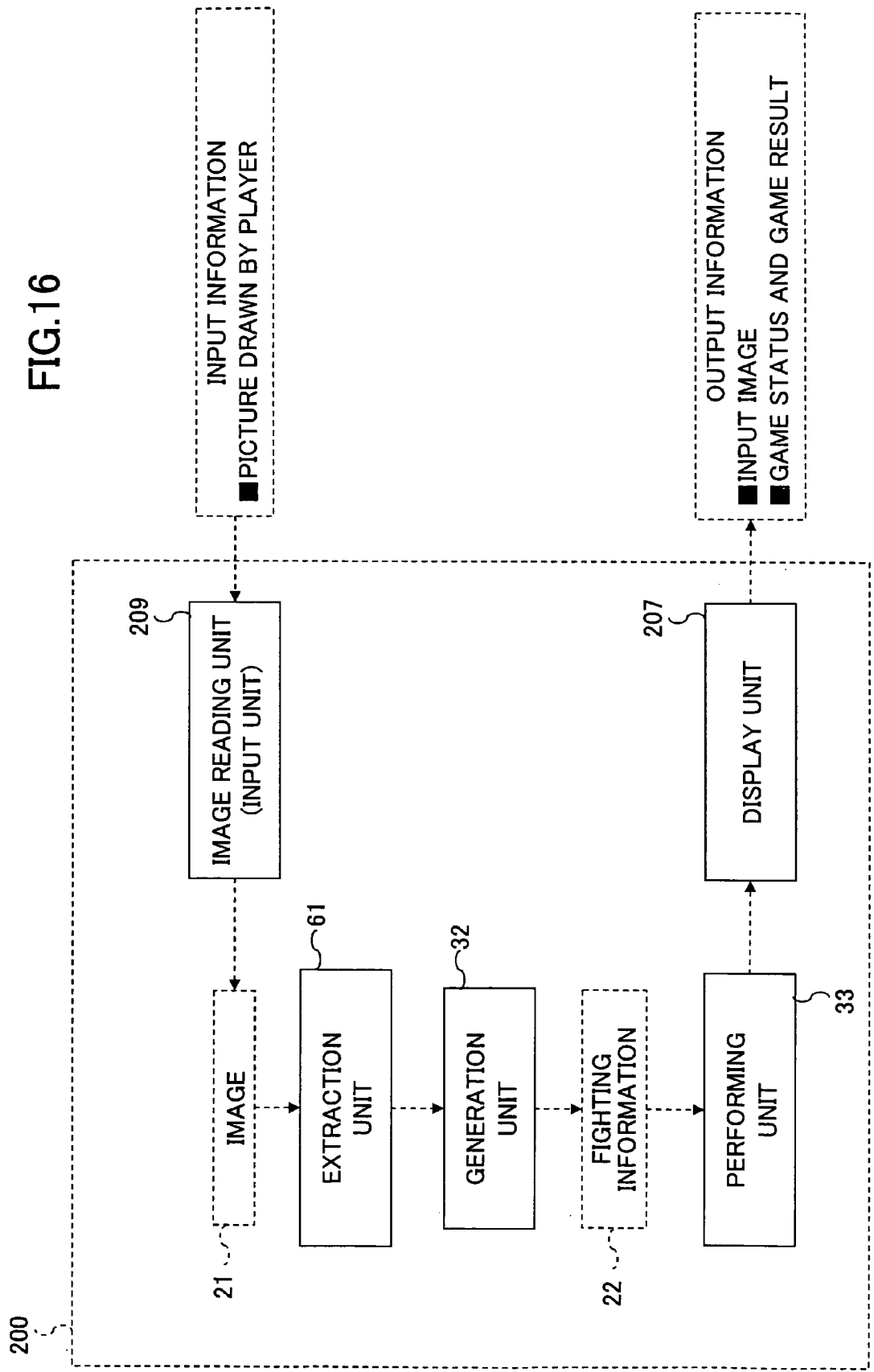
FIG. 16 is a block diagram showing an example of a main functional configuration of an image processing apparatus according to a fourth embodiment of the present invention.
Figure 17:
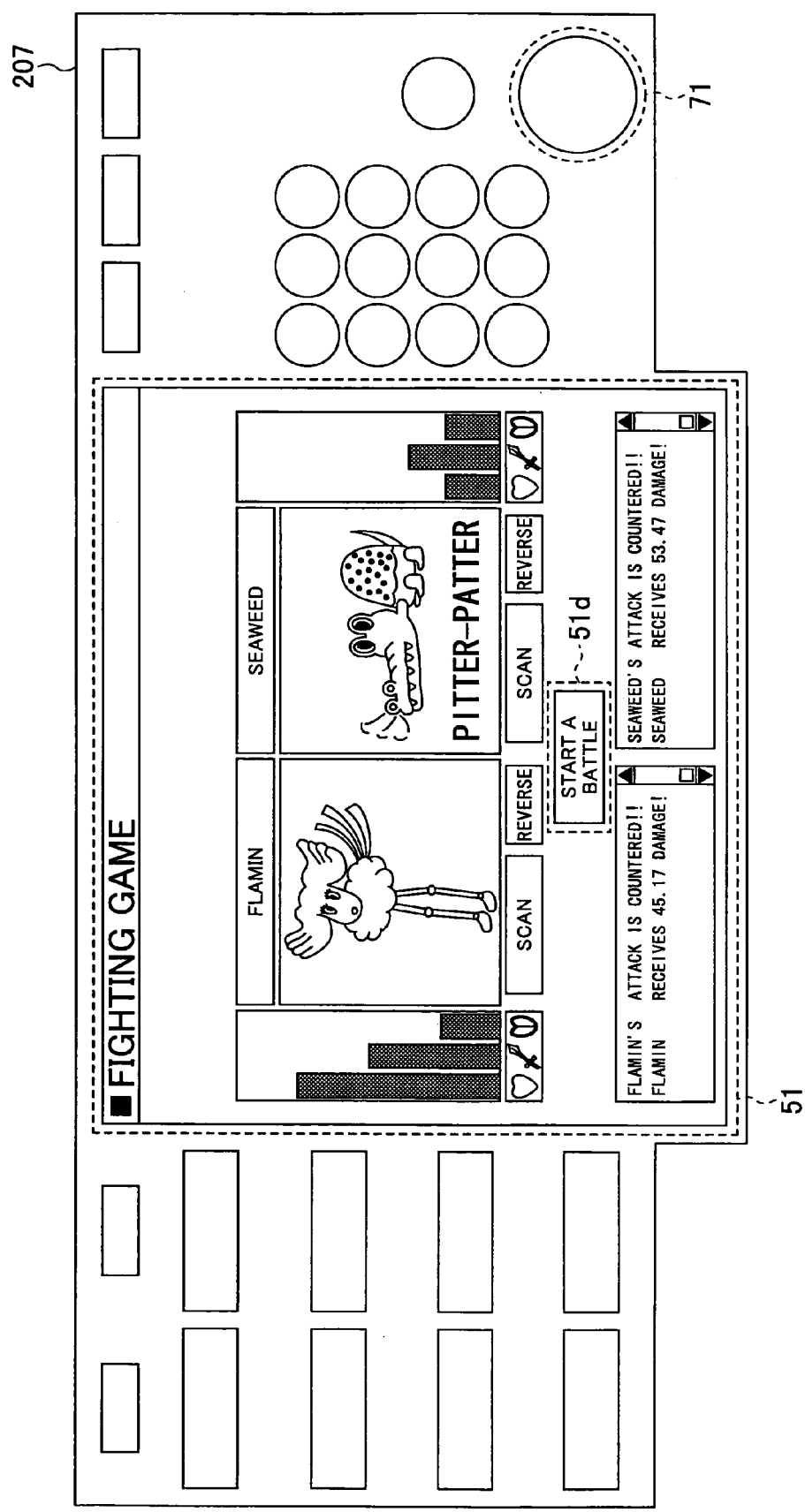
FIG. 17 is a diagram showing an example of a display screen upon performing a game according to a fourth embodiment of the present invention.

With reference to FIGS. 16 and 17, the following describes each unit constituting the main functions of the "game functions" according to the present embodiment realized in accordance with the hardware configuration of the image processing apparatus 200 shown in FIG. 15.

FIG. 16 is a block diagram showing an example of units constituting the main functions included in the image processing apparatus 200 according to the fourth embodiment of the present invention.

The functions included in the image processing apparatus 200 according to the present embodiment are constituted using the generation unit 32, the performing unit 33 included in the information processing apparatus 100 described in the first embodiment, and an extraction unit 61.

The present embodiment is different from each of the above-mentioned embodiments mainly in that (1) a picture designed by the player is input using the image reading unit 209 included in the image processing apparatus 200 and that (2) a game status during a game is notified to the player using the display unit 207 included in the image processing apparatus 200.

In the following, the above-mentioned difference (1) is described.

In each of the above-mentioned embodiments, the picture designed by the player as shown in FIG. 3 is input from an image reading device such as a scanner connected to the information processing apparatus 100 via the external device I/F 16. In this manner, in each of the above-mentioned embodiments, the picture designed by the player is obtained in the information processing apparatus 100 via the image reading device and a game is performed, so that such an image reading device is necessary in addition to the information processing apparatus 100 so as to realize the game functions.

In the present embodiment, as described in the difference (1), the picture is input (by an input unit) from the image reading unit 209 included in the image processing apparatus 200. The picture designed by the player and read using the image reading unit 209 is held on the RAM of the main storage unit 202 as the image 21.

In addition, the image processing apparatus 200 may input the image 21 of the character for the game via a touch panel of the display unit 207. In other words, the image processing apparatus 200 according to the present embodiment includes a unit inputting the picture drawn via the touch panel of the display unit 207 as the image 21.

Further, in the present embodiment, "image extraction in a rectangular area" performed by the input unit 31 in each of the above-mentioned embodiments is performed by the extraction unit 61.

The extraction unit 61 extracts an image in a rectangular area determined in advance as shown in the area 41*a* and the area 41*b* of FIG. 3 and inputs the extracted image to the generation unit 32. The extraction unit 61 uses an OCR function included in the image processing apparatus 200 for the extracted image, extracts text information such as the player's name, character's name, and the like, and holds the extracted text information on the RAM of the main storage unit 202. Further, the extraction unit 61 performs the above-mentioned data processing using the control unit 201 and holds the extracted image from the area 41*b* of FIG. 3 on the RAM of the main storage unit 202.

Moreover, in each of the above-mentioned embodiments, the player designs the character on "paper" as the image forming medium 41, for example. In the present embodiment, the image forming medium 41 is not limited to "paper", so that the image forming medium 41 may be paper, electronic paper, rewritable paper, and the like as long as such a medium is readable for the image reading unit 209 included in the image processing apparatus 200.

In this manner, the image processing apparatus 200 according to the present embodiment includes the image reading unit 209, so that it is not necessary to additionally prepare a unit reading the picture designed by the player as the image 21.

The generation unit 32 generates the fighting information 22 used in a game on the basis of the amount of features of the image 21 input by the above-mentioned extraction unit 61. The performing unit 33 performs the game on the basis of the fighting information 22 generated by the generation unit 32.

The generation unit 32 and the performing unit 33 according to the present embodiment have the same functions as described in each of the above-mentioned embodiments, so that description thereof is omitted.

In the following, the above-mentioned difference (2) is described.

In each of the above-mentioned embodiments, the display screen 51 provided with a user interface (UI) for instructing game operation as shown in FIG. 5 is displayed on a display device such as CRT, LCD, and the like connected to the information processing apparatus 100 via the input device I/F 18. In this manner, in each of the above-mentioned embodiments, the display device is necessary in addition to the information processing apparatus 100 so as to perform the game since the game start button 51d and information on a game status when the game is performed are displayed on the display device connected to the information processing apparatus 100 via the output device I/F 17.

In the present embodiment, as described in the difference (2), operational functions are displayed on the display unit 207 included in the image processing apparatus 200.

FIG. 17 is a diagram showing an example of the display screen 51 upon performing a game according to the fourth embodiment of the present invention.

As shown in FIG. 17, in the image processing apparatus 200 according to the present embodiment, the same information as shown in FIG. 5 in each of the above-mentioned embodiments is displayed on the display unit 207. The display unit 207 renews the display screen 51 on the basis of a game result and the like from the performing unit 33 operated by the control unit 201 so as to provide up-to-date information to the player.

Further, the display unit 207 includes an operation key for instructing operation of the functions included in the image processing apparatus 200, setting operational conditions, and the like such as the start key 71 used as a user interface (UI) for allowing the user to instruct a copying operation.

In the present embodiment, when the start key is pressed so as to instruct an operation of obtaining the picture designed by the player from the image reading unit 209 at a beginning of the game, namely, when the start key is pressed to start the game in association with an instruction of an operation of obtaining an image in the image processing apparatus 200, the performing unit 33 performs the game. Further, the image reading unit 209 has a touch panel function, so that it is possible to start the game by touching the game start button 51d displayed on the display screen 51.

In this manner, in the image processing apparatus 200 according to the present embodiment, due to the display unit 207 included in the apparatus, it is not necessary to additionally prepare a device for instructing the game start or displaying the game status while the game is performed.

The image processing apparatus 200 according to the present embodiment allows the player to readily perform a competition game due to the above-mentioned image reading unit 209, display unit 207, and the like in comparison with each of the above-mentioned embodiments.

(Processing Procedure of the "Game Functions")

Figure 18:
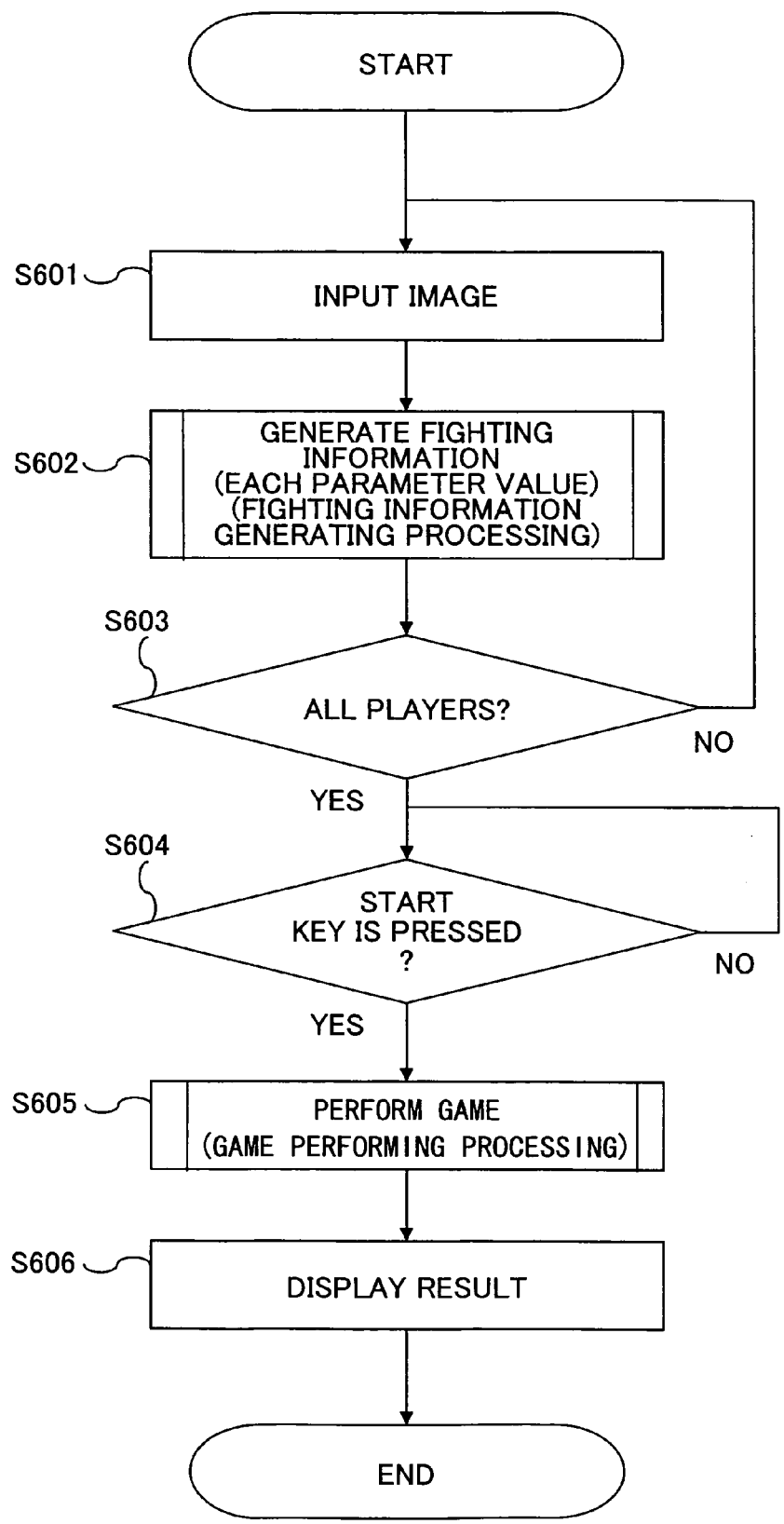
FIG. 18 is a flowchart showing an example of an information processing procedure according to a fourth embodiment of the present invention.

The following describes an information processing procedure in the "game functions" included in the image processing apparatus 200 according to the present embodiment with reference to FIG. 18.

Fighting information generating processing and game performing processing described in each of the above-mentioned embodiments with reference to FIGS. 7, 11, and 14 are also performed in the present embodiment by the control unit 201 included in the image processing apparatus 200 in the same processing procedure, so that the same drawings and the same reference numerals are used and description thereof is omitted.

FIG. 18 is a flowchart showing an example of the information processing procedure according to the fourth embodiment of the present invention.

The image processing apparatus 200 according to the present embodiment expands an information processing program processing the "game functions" on the RAM of the main storage unit 202 and executes the program using the control unit 201, the program being stored in auxiliary storage unit 203 included in the image processing apparatus 200. In this case, the following processing procedure (S601 to S606) is performed.

First, the image processing apparatus 200 according to the present embodiment reads the picture of the character designed by the player from the image reading unit 209, extracts a predetermined area from the image 21 obtained in the reading, and inputs an extracted image obtained in the extraction (S601). In addition, the image processing apparatus 200 may input the image 21 of the character for the game via the touch panel of the display unit 207. In other words, the image processing apparatus 200 according to the present embodiment includes a unit inputting the picture drawn via the touch panel of the display unit 207 as the image 21.

The image processing apparatus 200 generates the fighting information 22 from the input extracted image (S602).

The image processing apparatus 200 judges whether character images are input and the fighting information 22 is generated for all the players participating in a game (S603).

If there is a player participating in the game whose character image or fighting information 22 is unprocessed (NO in S603), the character image is input and the fighting information 22 is generated for the subject player.

By contrast, if processing is performed for all the players participating in the game (YES in S603), the image processing apparatus 200 judges whether the start key 71 included in the display unit 207 is pressed and performing of the game is instructed (S604).

If the start key 71 is not pressed (NO in S604), the image processing apparatus 200 awaits until the start key 71 is pressed.

By contrast, if the start key 71 is pressed (YES in S604), the game is performed on the basis of the fighting information 22 for each player (S605).

The image processing apparatus 200 displays a game result on the display unit 207 (S606).

In this manner, the image processing apparatus 200 according to the present embodiment realizes the processing "for inputting the character designed by the player as the image 21 using the image reading unit 209, generating the fighting information 22 such as the offensive ability and the defensive ability used in the game from the amount of features of the input image 21, and performing the game on the basis of the generated fighting information 22 when the start key 71 included in the display unit 207 is pressed" in accordance with the processing procedure (S601 to S606) shown in FIG. 18.

As mentioned above, according to the fourth embodiment of the present invention, the image processing apparatus 200 according to the present embodiment realizes the "game functions" in the following processing procedure.

(Procedure 1: Input of a Character Image)

The image processing apparatus 200 according to the present embodiment reads the picture designed by the player as the image 21 using the image reading unit 209 and inputs the read image to the image processing apparatus 200.

In accordance with a position and a range of an area determined in advance in a coordinate space on the paper, the extraction unit 61 extracts an image area in which the character is designed from the read image 21. And the extracted image is held on the RAM of the main storage unit 202.

In addition, the image processing apparatus 200 may input the image 21 of the character for the game via the touch panel of the display unit 207. In other words, the image processing apparatus 200 according to the present embodiment includes a unit inputting the picture drawn via the touch panel of the display unit 207 as the image 21.

(Procedure 2: Generation of the Fighting Information 22)

The image processing apparatus 200 according to the present embodiment generates the fighting information 22 used in the game using the generation unit 32 on the basis of the amount of features of the image 21 input by the image reading unit 209.

The generation unit 32 repeatedly extracts data from the extracted image by predetermined bits, the extracted image having been extracted by the extraction unit 61, classifies the extracted data into each type of the parameters indicating the fighting capabilities in the fighting information 22 in a predetermined classification rule, and generates the amount of features of the image 21 on the basis of the extraction frequency of the data having predetermined bits classified into each type of the parameters (Formula 1).

Further, the generation unit 32 normalizes the random numerical values generated on the basis of the extraction frequency of the data which is the amount of features of the image 21 (Formula 2) and generates the fighting information 22.

(Procedure 3: Performing a Game)

When the start key 71 included in the display unit 207 is pressed, the image processing apparatus 200 according to the present embodiment performs the game using the performing unit 33 on the basis of the fighting information 22 of the player generated by the generation unit 32. In this case, the game status of the game performed by the performing unit 33 below is displayed on the display unit 207.

The performing unit 33 decides which player makes the first offensive move based on a random numerical value, multiplies the "offensive ability" parameter value of the fighting character of the player making the first move and the "defensive ability" parameter value of the fighting character of the player making the second move by a random numerical value, and calculates values of the substantial offensive ability and the substantial defensive ability.

Next, the performing unit 33 subtracts a difference between the substantial offensive ability and the substantial defensive ability from the "life" parameter value of the fighting character of the player making the second move, and renews the "life" parameter value of the fighting character of the player making the second move.

The performing unit 33 switches the player making the first move on the offense and the player making the second move on the defense and repeatedly performs this processing until the "life" parameter value of one of the players becomes not more than zero. When the "life" parameter value of one of the players becomes not more than zero, the performing unit 33 judges the player as a loser of the game and decides a result of the competition.

In this manner, the image processing apparatus 200 according to the present embodiment inputs, using the image reading unit 209, the character designed by the player as the image 21 in accordance with the above-mentioned procedures 1 to 3, generates the fighting information 22 such as the offensive ability and the defensive ability used in the game from the amount of features of the input image 21, and performs the game on the basis of the generated fighting information 22 when the start key 71 included in the display unit 207 is pressed.

In accordance with this, the image processing apparatus 200 according to the present embodiment is capable of allowing the players to readily perform a competition game and to exercise their creativity so as to enjoy the game.

Further, in the image processing apparatus 200 according to the present embodiment, by assigning the operation key which is often used by the player to an event key for starting the game, it is possible to readily start the game without performing a complicated operation. Further, the image processing apparatus 200 according to the present embodiment is capable of notifying the game status to the player facing the image processing apparatus 200 by displaying the game status on the display unit 207 formed integrally with the image processing apparatus 200.

In the above-mentioned description, the present invention is described based on the first to the fourth embodiments. It is possible to realize the "game functions" included in the information processing apparatus 100 according to the first to the third embodiments and in the image processing apparatus 200 according to the fourth embodiment by coding each processing procedure described in the first to the fourth embodiments in a programming language suitable for each operating environment (platform) and executing the program in a computer. Accordingly, it is possible to store the program (information processing program) for performing the "game functions" according to the first to the fourth embodiments of the present invention in a computer-readable storage medium and it is possible to store and install the program in a non-volatile storage device such as the auxiliary storage unit 13, auxiliary storage unit 203, and the like via the external storage device I/F 15 and the external storage device I/F 205. Further, it is possible to receive the program from an electrical communication line via the network I/F 14 and the network I/F 204 and install the program in the same manner as in the case of a storage medium.

Moreover, in the information processing apparatus 100 according to the first to the third embodiments of the present inventions, "plural players play a game on in the same information processing apparatus 100". However, the present invention is not limited to this.

The information processing apparatus 100 according to the first to the third embodiments includes the network I/F 14, so that it is possible to perform a competition game via a network as long as other information processing apparatus 100 is connected via the network connected to the network I/F 14, for example. In the image processing apparatus 200 according to the fourth embodiment, in the same manner, it is possible to perform a competition game between the information processing apparatus 100 according to the first to the third embodiments and the image processing apparatus 200 according to the fourth embodiment via a network.

In the first to the fourth embodiments, each of the parameters of the fighting information 22 is described as the "life", "offensive ability", and "defensive ability". However, the present invention is not limited to this.

In the information processing apparatus 100 according to the first to the third embodiment of the present invention, the "image extraction by the input unit 31" is described in the embodiment as "the extraction unit 61 extracts an image in a rectangular area determined in advance as indicated by the area 41*a* and the area 41*b* of FIG. 3". However, the present invention is not limited to the shape of this extraction area.

Also, the image processing apparatus 200 according to the fourth embodiment is not limited to this.

It is possible to perform the method for extracting a partial image from a predetermined area in an image by using a conventional "area extraction technique" and to perform the method for calculating the degree of similarity of images based on the reference image by using a conventional "image similarity calculation technique".

The present invention is not limited to the specifically disclosed embodiment, and variations and modifications may be made without departing from the scope of the present invention.

The present application is based on Japanese priority application No. 2007-079485 filed Mar. 26, 2007, Japanese priority application No. 2007-260172 filed Oct. 3, 2007, Japanese priority application No. 2008-001602 filed Jan. 8, 2008, the entire contents of which are hereby incorporated herein by reference.

What is claimed is:

1. An information processing apparatus, comprising:
   an input unit configured to input an image of a drawing from a medium, the image of the drawing being drawn on the medium by a user;
   a generation unit configured to generate an amount of features of the input image and generate a parameter set based on the amount of features of the input image; and
   a performing unit configured to display the input image on a display unit, perform a process to the input image based on the parameter set when the input image is displayed on a display unit, and change at least one parameter value in the parameter set continuously and automatically for performing the process.

2. The information processing apparatus according to claim 1, wherein
   the generation unit is configured to repeatedly extract data from the input image, the extracted data being represented by a number of bits, the generation unit is further configured to classify the extracted data into each type of parameter in the parameter set in accordance with a classification rule determined in advance, and generate the amount of features of the input image corresponding to each type of parameter based on an extraction frequency of the extracted data of each type of parameter.

3. The information processing apparatus according to claim 2, wherein
   the generation unit is configured to generate a parameter value for each type of parameter based on a random numerical value generated based on the amount of features corresponding to each type of parameter.

4. An information processing method, the method comprising:
   inputting an image of a drawing from a medium, the image of the drawing drawn on the medium by a user;
   generating, by a generation unit, an amount of features of the input image and generate a parameter set based on the amount of features of the input image;
   displaying, by a performing unit, the input image on a display unit;
   performing, by the performing unit, a process to the input image based on the parameter set when the input image is displayed on the display unit; and
   change at least one parameter value in the parameter set continuously and automatically for performing the process.

5. A non-transitory computer-readable storage medium storing a computer-readable information processing program, which, when executed by a computer, causes the computer to perform a process comprising:
   input an image of a drawing from a medium, the image of the drawing drawn on the medium by a user;
   generate an amount of features of the input image and generate a parameter set based on the amount of features of the input image;
   display the input image on a display unit;
   perform a process to the input image based on the parameter set when the input image is displayed on a display unit; and
   change at least one parameter value in the parameter set continuously and automatically for performing the process.

6. The information processing apparatus of claim 1, wherein the performing unit is configured to perform the process to each of a plurality of images input by the input unit.

7. The information processing apparatus of claim 1, wherein the performing unit is configured to perform a game by performing the process to the image input by the input unit and an additional image input by the input unit and is configured to generate a parameter set for the additional image.

8. The information processing apparatus of claim 1, wherein the medium is at least one of paper, electronic paper, rewritable paper, electric tablet and touch panel.

9. The information processing apparatus of claim 1, wherein the generation unit is configured to extract a plurality of bit patterns from the input image and generate the amount of features based on extracted number of times the generation unit extracts the plurality of bit patterns.

10. The information processing apparatus of claim 1, wherein
    the performing unit is configured to perform the process to the input image and change the parameter continuously and automatically until the value of the at least one parameter becomes zero.

* * * * *